(12) United States Patent
Nakamori et al.

(10) Patent No.: US 6,799,109 B2
(45) Date of Patent: Sep. 28, 2004

(54) VEHICLE CONTROL APPARATUS

(75) Inventors: Yukinori Nakamori, Anjo (JP); Takehiko Suzuki, Anjo (JP); Satoru Wakuta, Anjo (JP); Takeshi Inuzuka, Anjo (JP)

(73) Assignee: Aisin AW Co., Ltd., Anjo (JP)

(*) Notice: Subject to any disclaimer, the term of this patent is extended or adjusted under 35 U.S.C. 154(b) by 11 days.

(21) Appl. No.: 10/366,667

(22) Filed: Feb. 14, 2003

(65) Prior Publication Data
US 2003/0171867 A1 Sep. 11, 2003

(30) Foreign Application Priority Data
Feb. 18, 2002 (JP) ........................ 2002-040679

(51) Int. Cl.[7] ............................ G06F 17/00; G06F 7/00
(52) U.S. Cl. ........................................ 701/54; 475/254
(58) Field of Search ............................ 701/54; 475/254, 475/31, 43, 60, 64, 69, 70, 108, 116, 125

(56) References Cited

U.S. PATENT DOCUMENTS 5,263,906 A * 11/1993 Antonov ................... 475/257
6,445,992 B2 * 9/2002 Wheeler et al. ............... 701/67

FOREIGN PATENT DOCUMENTS

| EP | 1 145 893 A1 | 10/2001 |
| JP | 2001-163071 | 6/2001 |

* cited by examiner

Primary Examiner—William A. Cuchlinski, Jr.
Assistant Examiner—Olga Hernandez
(74) Attorney, Agent, or Firm—Oliff & Berridge, PLC

(57) ABSTRACT

A vehicle control apparatus including an engine, an automatic transmission, a hydraulic servo, a mechanical oil pump, an electric oil pump and a controller that controls driving of the electric oil pump and generates a standby pressure supplied to the hydraulic servo based upon a driving state of the mechanical oil pump, wherein the standby pressure is set less than a line pressure generated based upon driving the mechanical oil pump during idling and equal to or greater than an engagement starting pressure by which the friction engagement element starts transmitting a torque.

28 Claims, 11 Drawing Sheets

|  | C-1 | C-2 | C-3 | B-1 | B-2 | B-3 | B-4 | B-5 | F-1 | F-2 |
|---|---|---|---|---|---|---|---|---|---|---|
| N |  |  |  |  |  |  |  | ○ |  |  |
| 1st | ○ |  |  |  |  | △ |  | ○ |  | ○ |
| 2nd | ○ |  |  | △ | ○ |  |  | ○ | ○ |  |
| 3rd | ○ |  |  | △ | ○ |  | ○ |  | ○ |  |
| 4th | ○ |  | ○ | △ | ○ |  |  |  | ○ |  |
| 5th | ○ | ○ | ○ |  |  |  |  |  |  |  |
| REV |  | ○ |  |  |  | ○ |  | ○ |  |  |

VEHICLE CONTROL APPARATUS

INCORPORATION BY REFERENCE

The disclosure of Japanese Patent Application No. 2002-040679 filed on Feb. 18, 2002 including the specification, drawings and abstract are incorporated herein by reference in its entirety.

BACKGROUND OF THE INVENTION

1. Field of Invention

The invention relates to a vehicle control apparatus having an idle stop function.

2. Description of Related Art

Conventionally, as is proposed, for example, in Japanese Patent Laid-Open Publication No. 2001-163071 and the like, there is a driving apparatus for a hybrid vehicle structured such that driving of a motor is directly connected to a crankshaft of an engine, and a driving force of the engine or the motor is transmitted to a driven wheel via an automatic transmission. In such a driving apparatus for the hybrid vehicle, a so-called idling stop system is provided which stops the engine while the vehicle is stopped, and restarts the engine at a time of starting.

For example, in the automatic transmission, a hydraulic control device is provided that hydraulically controls a friction engagement element for transmitting a driving force, and a mechanical oil pump is provided interlocking with the engine for supplying an oil pressure to the hydraulic control device. However, the engine is stopped when an idling stop as mentioned above is performed. Therefore, the mechanical oil pump stops and the oil pressure for engaging the friction engagement element is lost, creating a neutral state. Accordingly, for example, when restarting the engine and starting the supply of oil pressure from the mechanical oil pump, the engagement of the friction engagement element requires time, creating a time lag until the vehicle actually starts. Also, a shock is generated due to a sudden engagement of the friction engagement element. Therefore, it is necessary to increase the oil pressure supplied to the hydraulic control device by an electric oil pump that is driven independent of the driving of the engine, when the engine is stopped, namely, when the mechanical oil pump is stopped.

SUMMARY OF THE INVENTION

When attempting to supply an oil pressure by the electric pump that is identical to the oil pressure supplied by the mechanical oil pump in a state where the engine is driving, it is necessary to upsize the motor in the electric oil pump. However, this creates a problem with an increase in electric power consumption.

The invention thus provides a vehicle control apparatus that solves the above-mentioned problem by setting a standby pressure to less than a line pressure generated based upon the driving of the mechanical oil pump during idling and equal to or greater than a pressure by which a friction engagement element starts transmitting a torque.

The vehicle control apparatus according to a first exemplary aspect of the invention may be structured such that the controller controls the driving of the electric oil pump and generates the standby pressure supplied to the hydraulic servo of the friction engagement element based upon the driving state of the mechanical oil pump, and the standby pressure is set less than the line pressure generated based upon the driving of the mechanical oil pump during idling, and equal to or greater than the engagement starting pressure by which the friction engagement element starts transmitting the torque. Therefore, it is possible to set a low standby pressure supplied by the electric oil pump, thus allowing downsizing of the electric oil pump in addition to enabling a reduction in electric power consumption.

The vehicle control apparatus according to a second exemplary aspect of the invention may be structured such that the controller controls the driving of the electric oil pump and generates the standby pressure supplied to the hydraulic servo of the friction engagement element based upon the driving state of the mechanical oil pump, and the standby pressure is set less than the line pressure generated based upon the driving of the mechanical oil pump during idling, and equal to or greater than the stroke pressure which brings the piston and the friction plate into mutual contact without a gap. Therefore, it is possible to set a low standby pressure supplied by the electric oil pump, thus allowing downsizing of the electric oil pump in addition to enabling a reduction in electric power consumption.

For the purposes of this disclosure, device and means may be considered synonyms. Both relate to a computer and its programs and encompass any necessary memory. The device may be implemented solely by circuitry, e.g. hardware, or a combination of hardware and software. Further, in some cases, as defined in the specification, the device/means may include other elements.

BRIEF DESCRIPTION OF THE DRAWINGS

The invention will be described with reference to the drawings in which:

FIGS. 3A and 3B are views showing an automatic transmission mechanism applied to the invention, in which FIG. 3A is a skeleton view of the automatic transmission mechanism and FIG. 3B is an operation table thereof;

FIGS. 5A and 5B are views showing a relation between an oil temperature and an operation electric voltage of an electric oil pump, in which FIG. 5A is a schematic view showing a relation between an oil pressure and a flow rate based upon the oil temperature, and FIG. 5B is a schematic view showing a relation between the oil temperature and the operation electric voltage of the electric oil pump;

DETAILED DESCRIPTION OF PREFERRED EMBODIMENTS

Figure 2:
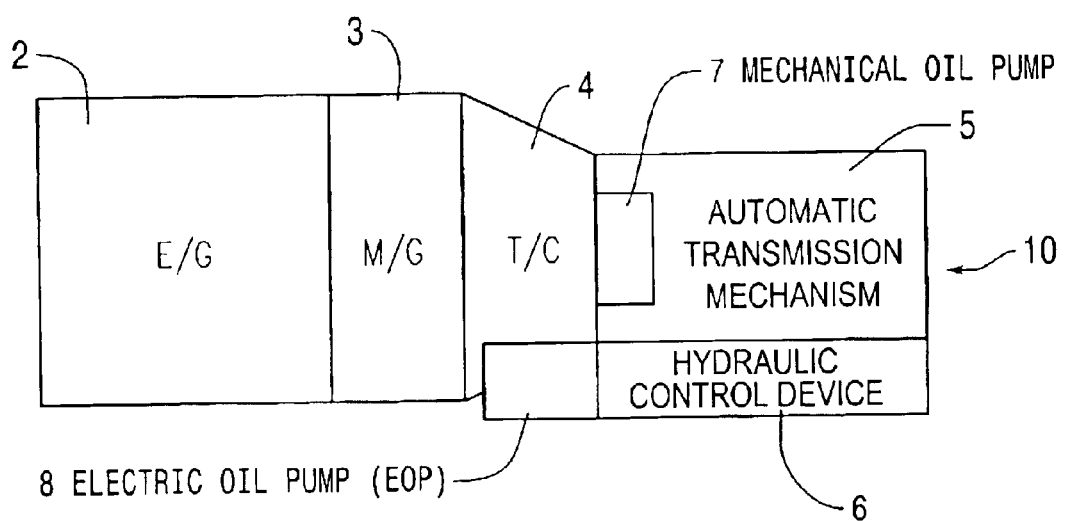
FIG. 2 is a block diagram showing a driving system of the vehicle according to the invention.
Figures 3A, 3B:
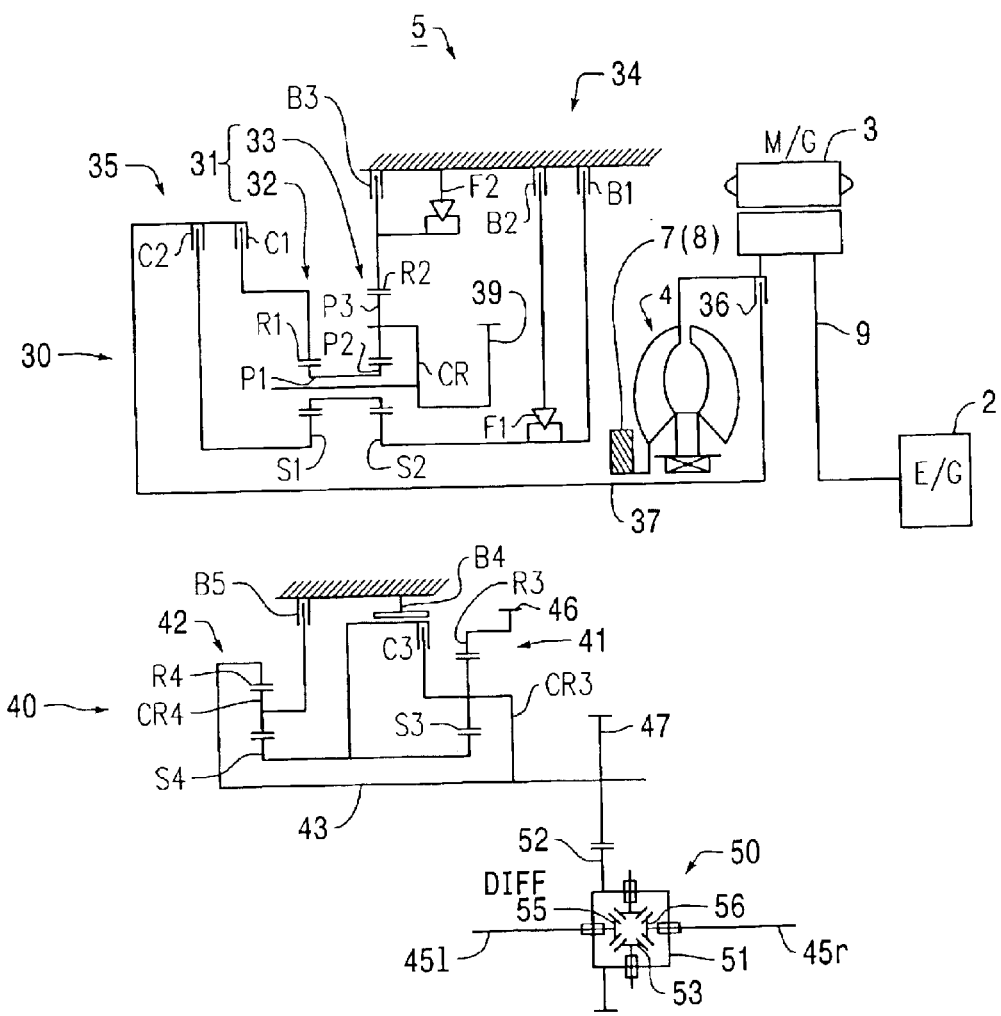

Hereafter, an embodiment of the invention will be described with reference to the drawings. First, a description will be given of a driving system of a vehicle to which a vehicle control apparatus according to the invention can be applied, and an automatic transmission mechanism provided therein, with reference to FIGS. 2 and 3. FIG. 2 is a block diagram showing a driving system of a vehicle according to the invention, and FIG. 3 is a view showing an automatic transmission mechanism 5 applied to the invention, in which FIG. 3A is a skeleton view of the automatic transmission mechanism 5, and FIG. 3B is an operation table thereof.

As shown in FIG. 2, a drive source is constituted by an engine 2, and a motor generator (M/G) (hereinafter, referred to simply as "motor") 3, wherein a driving force thereof is output to an automatic transmission 10. The automatic transmission 10 is constituted by a torque converter (T/M) 4 that is an example of a fluid transmitting device, the automatic transmission mechanism 5, a hydraulic control device 6, a mechanical oil pump 7, and an electric oil pump 8. The automatic transmission mechanism 5 changes an inputted driving force, based upon a predetermined vehicle traveling condition, in order to output an appropriate driving force to a tire wheel and the like. Further, a plurality of friction engagement elements for changing speed are provided, and the hydraulic control device 6 for hydraulically controlling the engagement of the friction engagement elements thereof and controlling the torque converter 4 is provided in the automatic transmission mechanism 5. Further, the mechanical oil pump 7 and the electric oil pump 8 for supplying oil pressure to the hydraulic control device 6 are respectively provided. The mechanical oil pump 7 interlocks with the engine 2 (and the motor 3) and is driven by a driving force thereof, and generates an oil pressure, a so-called line pressure, in the hydraulic control device 6 based upon the rotation of the engine 2 via a primary regulator valve 61 described later or the like. Further, the electric oil pump 8 is independent from the driving force of the engine 2 (and the motor 3), and is driven by a motor for an electric oil pump 8 to which electric power is supplied from a battery (not shown), and generates oil pressure in the hydraulic control device 6 based upon the electric power (electric voltage).

Next, a description will be given of the automatic transmission mechanism 5. As shown in FIG. 3A, the motor 3 is directly connected to the crankshaft 9 to which the driving force of the engine 2 is output, and the mechanical oil pump 7 is connected via a turbine runner of the torque converter 4, namely, the driving rotation of the mechanical oil pump 7 is interlocked with the rotation of the engine 2 and the rotation of the motor 3 by the crankshaft 9.

On the other hand, a main transmission mechanism 30 is arranged on a first shaft (hereinafter, referred to as an "input shaft") 37 arranged in alignment with an engine output shaft, and the driving force is transmitted to the input shaft 37 from the engine 2 and the motor 3 via a pump impeller of the torque converter 4 having a lockup clutch 36. The mechanical oil pump 7 adjacent to the torque converter 4, a brake portion 34, a planetary gear unit portion 31 and a clutch portion 35 are arranged in the input shaft 37 in this order.

The planetary gear unit portion 31 is constituted by a simple planetary gear 32 and a double pinion planetary gear 33. The simple planetary gear 32 is constituted by a sun gear S1, a ring gear R1, and a carrier CR supporting a pinion P1 engaged with these gears, and the double pinion planetary gear 33 is constituted by a sun gear S2, a ring gear R2, as well as a carrier CR supporting a pinion P2 engaged with the sun gear S1 and a pinion P3 engaged with the ring gear R2 so as to engage with each other. Further, each of the sun gear S1 and the sun gear S2 is rotatably supported by a hollow shaft which is rotatably supported by the input shaft 37.

Further, the carrier CR is commonly used between both of the planetary gears 32 and 33, and the pinion P1 and the pinion P2, which are respectively engaged with the sun gears S1 and S2, are connected so as to integrally rotate.

The brake portion 34 is structured such that a one-way clutch F1, a brake B1 and a brake B2 are arranged in order from an inner diameter side towards an outer diameter direction, and a counter drive gear 39 is connected to the carrier CR via splines. Further, a one-way clutch F2 is interposed in the ring gear R2, and a brake B3 is disposed between an outer periphery of the ring gear R2 and a case. Further, a clutch portion 35 is provided with a forward clutch (hereinafter, referred to simply as a "clutch") C1 and a direct clutch C2 which are input clutches (friction engagement elements); the clutch C1 is interposed in an outer periphery of the ring gear R1, and the direct clutch C2 is disposed between an inner periphery of a movable member (not shown) and a flange portion connected to an end of the hollow shaft.

A sub transmission mechanism 40 is provided on a second shaft 43 arranged in parallel to the input shaft 37, and the input shaft 37 and the second shaft 43 are structured in a triangular shape from a side view in combination with a third shaft constituted by differential shafts (left and right axles) 45*l* and 45*r*. Further, the sub transmission mechanism 40 has simple planetary gears 41 and 42, and sun gears S3 and S4 are integrally connected with each other, and a carrier CR3 and a ring gear R4 are integrally connected, thereby constructing a Simpson type gear train. Further, a ring gear R3 is connected to a counter driven gear 46 to structure an input portion, and the carrier CR3 and the ring gear R4 are connected to a reduction gear 47 forming an output portion. Further, a UD direct clutch C3 is disposed between the ring gear R3 and the integral sun gears S3 and S4. The integral sun gear S3 (S4) can be appropriately retained by a brake B4, and the carrier CR4 can be appropriately retained by a brake B5. Accordingly, the sub transmission mechanism 40 can obtain a third forward gear speed stage.

Further, a differential apparatus 50 constituting a third shaft has a differential case 51, and a gear 52 engaged with the speed reduction gear 47 is fixed to the case 51. Further, a differential gear 53 and left and right side gears 55 and 56 are mutually engaged and rotatably supported in an inner portion of the differential case 51, and the left and right axles 45*l* and 45*r* extend from the left and right side gears. Accordingly, rotation from the gear 52 diverges in correspondence to a load torque, and is transmitted to the left and right front tire wheels via the left and right axles 45*l* and 45*r*.

A hydraulic servo (not shown) that is driven and controlled by a supply of oil pressure controlled by the hydraulic control device 6 mentioned above is provided in each of the clutches C1 and C2 and the brakes B1, B2, B3, B4 and B5. The hydraulic servo has a piston that moves, with pressure, a plurality of inner friction plates and outer friction plates (hereinafter, referred to simply as "friction plates") disposed between gaps when the clutches and the brakes are released. The piston also moves against the friction plate based upon the supplied oil pressure so as to freely operate the engagement state of the clutches and the brakes in accordance with the pressed state.

Next, a description will be given of an operation of the automatic transmission mechanism 5 with reference to the operation table shown in FIG. 3B. In the first speed (1ST) state, the clutch C1, the one-way clutch F2 and the brake B5 are engaged. Accordingly, the main transmission mechanism 30 goes into the first speed, and the reduced rotation is transmitted to the ring gear R3 in the sub transmission mechanism 40 via the counter gears 39 and 46. The sub transmission mechanism 40 is in the first speed state since the carrier CR4 is stopped by the brake B5, and the reduced rotation of the main transmission mechanism 30 is further reduced by the sub transmission mechanism 40, and is transmitted to the axles 45l and 45r via the gears 47 and 52 and the differential apparatus 50.

In a second speed (2ND) state, in addition to the clutch C1, the brake B2 is engaged, the clutch is smoothly switched from the one-way clutch F2 to the one-way clutch F1, and the main transmission mechanism 30 goes into a second speed state. Further, the sub transmission mechanism 40 is in the first speed state because of the engagement of the brake B5, and second speed can be obtained in the entire automatic transmission mechanism 5 through combining this second speed state and first speed state.

In a third speed (3RD) state, the main transmission mechanism 30 is in the same state as the second speed state mentioned above in which the clutch C1, the brake B2 and the one-way clutch F1 are engaged, and the sub transmission mechanism 40 engages the brake B4. Then, the sun gears S3 and S4 are fixed, and the rotation from the ring gear R3 is output from the carrier CR3 as a second speed rotation. Accordingly, a third speed can be obtained in the entire automatic transmission mechanism 5 based upon the second speed of the main transmission mechanism 30 and the second speed of the sub transmission mechanism 40.

In a fourth speed (4TH) state, the main transmission mechanism 30 is in the same state as the second speed and third speed states mentioned above in which the clutch C1, the brake B2 and the one-way clutch F1 are engaged, and the sub transmission mechanism 40 releases the brake B4 and engages the UD direct clutch C3. In this state, the ring gear R3 and the sun gear S3 (S4) are connected, and both planetary gears 41 and 42 integrally rotate and rotate directly connected. Accordingly, a fourth speed rotation can be obtained in the entire automatic transmission mechanism 5 by combining the second speed of the main transmission mechanism 30 and the direct connection (third speed) of the sub transmission mechanism 40.

In a fifth speed (5TH) state, the clutch C1 and the direct clutch C2 are engaged, the rotation of the input shaft 37 is transmitted to both the ring gear R1 and the sun gear S1, and the main transmission mechanism 30 rotates directly connected where the gear unit 31 integrally rotates. Further, the sub transmission mechanism 40 rotates directly connected where the UD direct clutch C3 is engaged, so that the third speed (direct connection) of the main transmission mechanism 30 and the third speed (direct connection) of the sub transmission mechanism 40 are combined, and a fifth speed rotation can be obtained in the entire automatic transmission mechanism 5.

In a reverse (REV) state, the brake B5 is engaged, and the direct clutch C2 and the brake B3 are engaged. In this state, the reverse rotation is produced in the main transmission mechanism 30, and the sub transmission mechanism 40 is maintained in the first speed state since the carrier CR4 is also stopped in a reverse rotation direction based upon the brake B5. Accordingly, the reverse rotation of the main transmission mechanism 30 and the first speed rotation of the sub transmission mechanism 40 is combined, allowing obtainment of a reduced reverse rotation.

In this case, in FIG. 3B, a triangular symbol denotes operating during engine braking. Namely, in first speed, the brake B3 is engaged and fixes the ring gear R2 in place of the one-way clutch F2. In second speed, third speed, and fourth speed, the brake B1 is engaged, and fixes the sun gear S2 in place of the one-way clutch F1.

Figure 4:
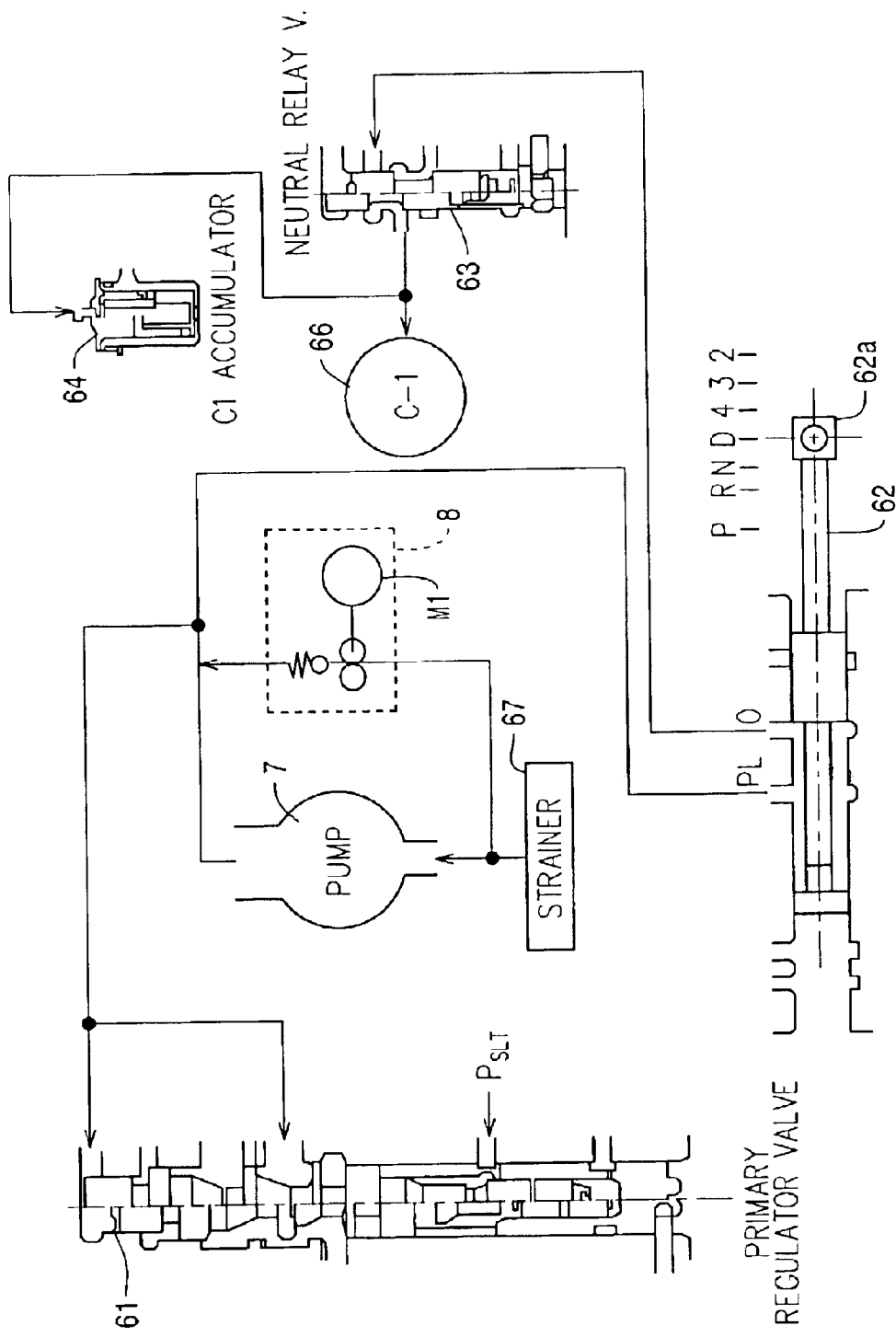
FIG. 4 is a partly omitted schematic view showing a hydraulic circuit of a hydraulic control device.

The hydraulic control device 6 will be subsequently described with reference to FIG. 4. FIG. 4 is a partially omitted schematic view showing a hydraulic circuit of the hydraulic control device 6. An actual hydraulic circuit is more complex and has many elements.

As shown in FIG. 4, gears (not shown) and the like are driven by the engine 2 and the motor 3 mentioned above, and the mechanical oil pump 7 discharges oil drawn from a strainer 67 and supplies the oil to the primary regulator valve 61. The primary regulator valve 61 inputs an SLT pressure PSLT based upon a throttle opening (or an accelerator opening) output from a linear solenoid valve (not shown), performs a pressure regulating operation by draining (discharging) based upon the SLT pressure PSLT to regulate a line pressure, and supplies the line pressure to a manual shift valve 62 and the like. Further, a pump gear is driven by the motor M1, and the electric oil pump 8 shown by a broken line in the figure draws oil from the strainer 67 to discharge, and supplies oil pressure to the primary regulator valve 61, the manual shift valve 62 and the like in the same manner. Namely, it is possible to supply the oil pressure to the primary regulator valve 61 and the manual shift valve 62 by either or both the mechanical oil pump 7 and the electric oil pump 8. In this case, the primary regulator valve 61 is linked with a hydraulic circuit (not shown) and supplies oil pressure to other valves and the like.

On the other hand, the manual shift valve 62 is linked with a neutral relay valve 63 to supply oil pressure, for example, when a manual shift lever 62a is shifted to a drive (D) range. The neutral relay valve 63 is linked with a hydraulic actuator 66 for the clutch C1 and an accumulator 64 for the clutch C1 to supply oil pressure, and control engagement of the clutch C1. Further, an oil temperature sensor (not shown) is provided on an oil passage linked with the hydraulic actuator 66 for the clutch C1, and can detect a temperature of oil (an oil temperature).

Figure 5A:
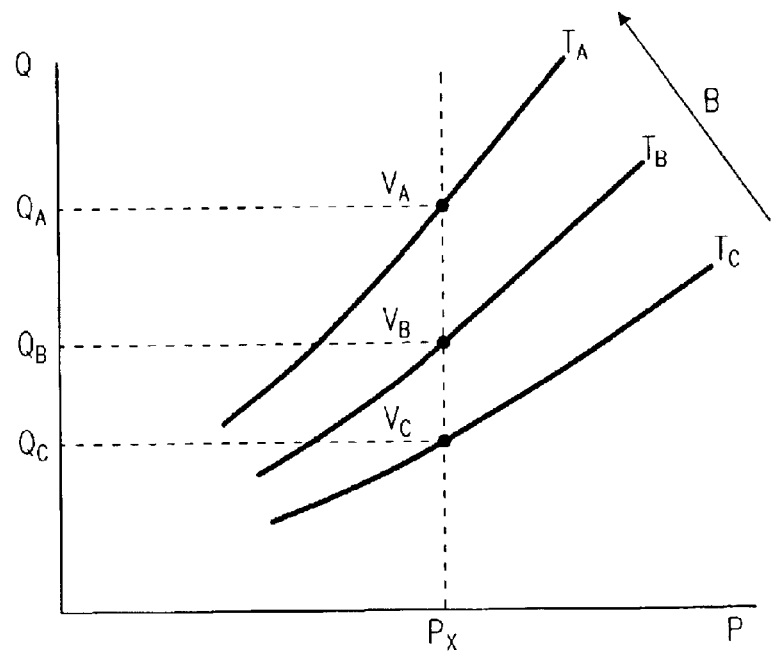
Figure 5B:
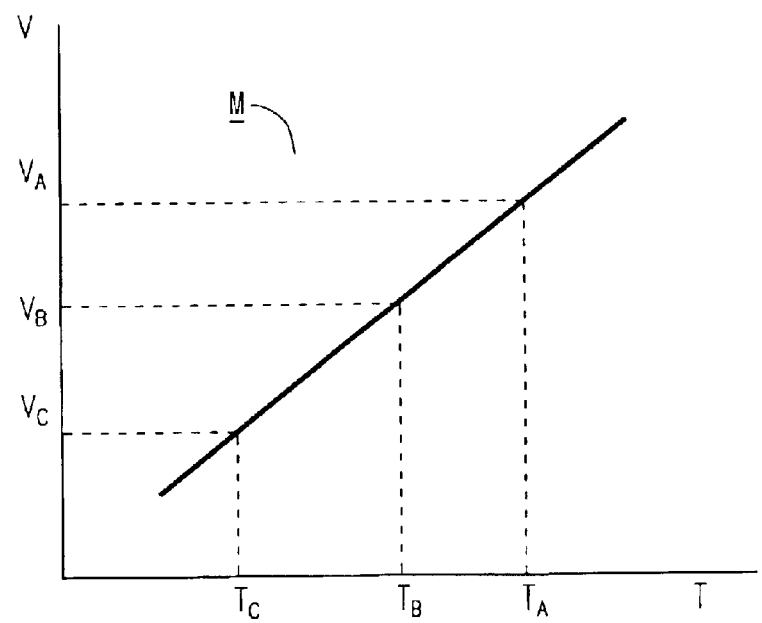

Subsequently, a description will be given of a relation between an oil pressure and a flow rate in the hydraulic control device 6 of the automatic transmission, and a relation between the oil temperature and an operating voltage of the electric oil pump with reference to FIG. 5. FIG. 5 is a view showing the relation between the oil temperature and the operating voltage of the electric oil pump, in which FIG. 5A is a schematic view showing the relation between the oil pressure and the flow rate based upon the oil temperature, and FIG. 5B is a schematic view showing the relation between the oil temperature and the operating voltage of the electric oil pump. In this case, an arrow B in FIG. 5A indicates a direction in which the oil temperature is high, and an oil temperature $T_A$, an oil temperature $T_B$ and an oil temperature $T_C$ indicate high temperature to low temperature in sequential order.

As shown in FIG. 5A, in the case of the oil temperatures $T_A$, $T_B$ and $T_C$, an oil pressure P supplied to the hydraulic control device 6 and a flow rate Q of the oil are approximately proportional. However, the oil pressure P changes according to changes of the oil temperature T in the fixed oil flow rate Q, due to a characteristic of the automatic transmission such as, in particular, changes in viscosity caused by the change in the amount of oil leakage and the oil temperature generated by the gap (so-called clearance) by which the valve drives. Namely, in order to obtain the fixed hydraulic pressure P, it is necessary to change the flow amount Q of the oil in response to the change in the oil temperature T and the amount of leakage. For example, in the case where the clutch oil pressure $P_{C1}$ to be supplied to the clutch C1 in the hydraulic control device 6 is an oil pressure $P_X$, it is necessary to supply a flow rate $Q_A$ at the oil temperature $T_A$. However, the oil pressure $P_X$ can be obtained by supplying the flow rate $Q_B$ at the oil temperature $T_B$, and supplying the flow rate $Q_C$ at the oil temperature $T_C$, respectively.

On the other hand, it is possible to determine the flow rate Q, based on the electric oil pump 8, by determining the rotational speed of the motor in the electric oil pump based upon the operating voltage (hereinafter, also referred to as "driving voltage") V. Accordingly, taking the amount of leakage mentioned above into consideration in advance, the substantially fixed oil pressure $P_X$ can be obtained by respectively supplying the operating voltage $V_A$ when the flow rate $Q_A$ is required, supplying the operating voltage $V_B$ when the flow rate $Q_B$ is required, and supplying the operating voltage $V_C$ when the flow rate $Q_C$ is required. Accordingly, as shown in FIG. 5B, it is possible to obtain a map M that is a relation between the oil temperature T and the operating voltage (electric oil pump voltage) V of the electric oil pump. The map M is stored in advance in a control portion U described later, and by referring to the map M, it is possible to set the operating voltage V of the electric oil pump 8 for supplying the oil pressure $P_X$ based upon the oil temperature T detected by the oil temperature sensor (not shown).

Figure 1:
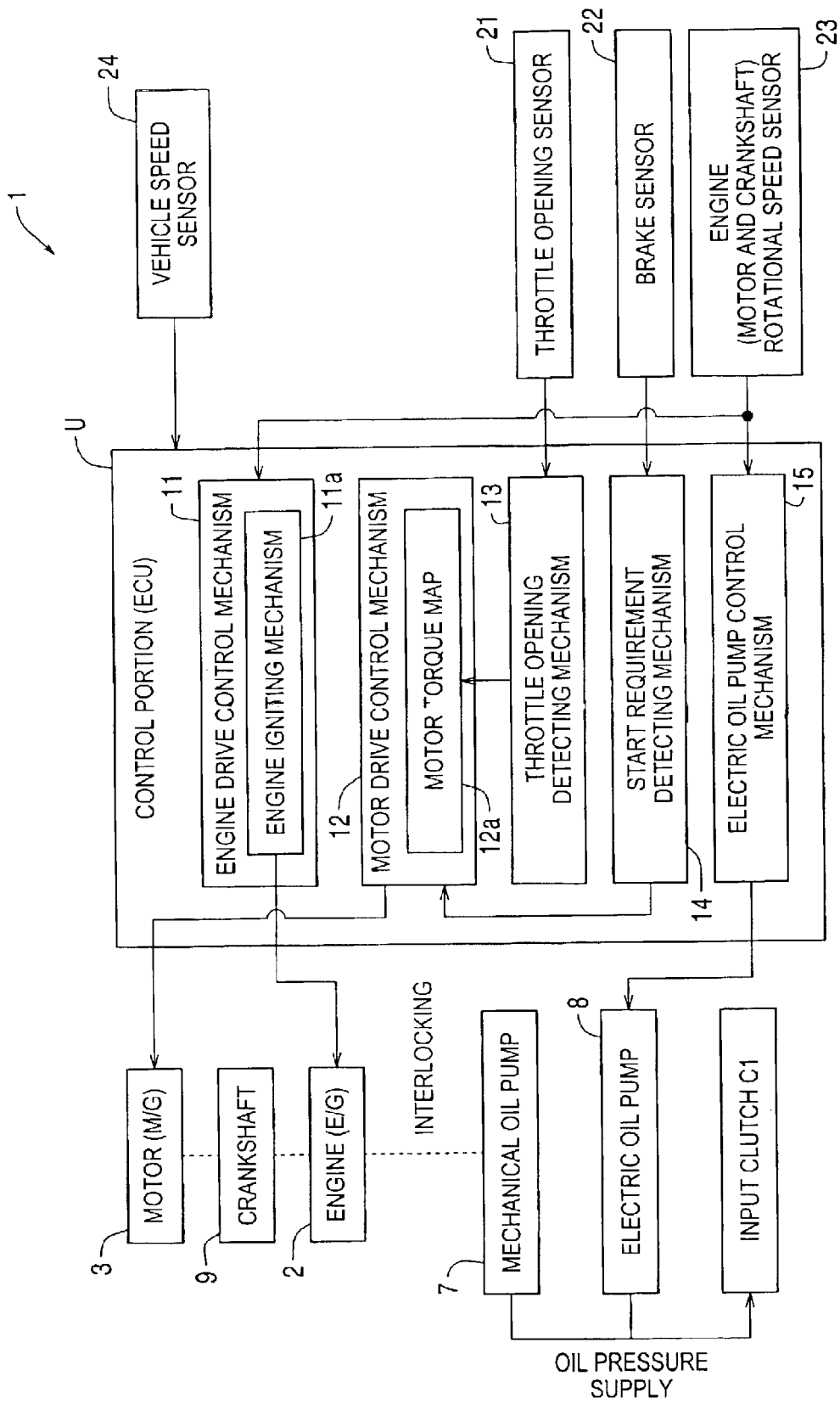
FIG. 1 is a block diagram showing a vehicle control apparatus according to an embodiment of the invention.

Next, a description will be given of the vehicle control apparatus according to the invention with reference to FIG. 1. FIG. 1 is a block diagram showing the vehicle control apparatus according to an embodiment of the invention. As shown in FIG. 1, the control apparatus 1 of the vehicle is provided with the control portion (ECU) U, and the control portion U has an engine igniting mechanism 11a for igniting the engine 2 once the engine 2 reaches a predetermined rotational speed after a stopped state, and is provided with an engine drive control mechanism 11 for executing control relating to the driving of the engine 2 such as a stop control of the engine 2 based upon a vehicle speed detected by a vehicle speed sensor 24 connected to the control portion U, a brake ON detected by a brake sensor 22, a judgment of a complete explosion state in the engine 2 described later, and the like.

Further, the control portion U is respectively provided with a motor drive control mechanism 12 that has a motor torque map (refer to FIG. 8 mentioned later) 12a and controls the driving of the motor 3, a throttle opening detecting mechanism 13 for detecting a throttle opening θd based upon a throttle opening sensor 21, a start requirement detecting mechanism 14 for detecting a start requirement from the driver based upon a brake OFF (release) which a brake sensor 22 detects, and an electric oil pump control mechanism 15 for driving and controlling the electric oil pump 8 by supplying the operating voltage V based upon the oil temperature T as described above. In this case, an engine (motor and crankshaft) rotational speed sensor 23 is connected to the engine igniting mechanism 11a and the electric oil pump control mechanism 15.

Figure 6:
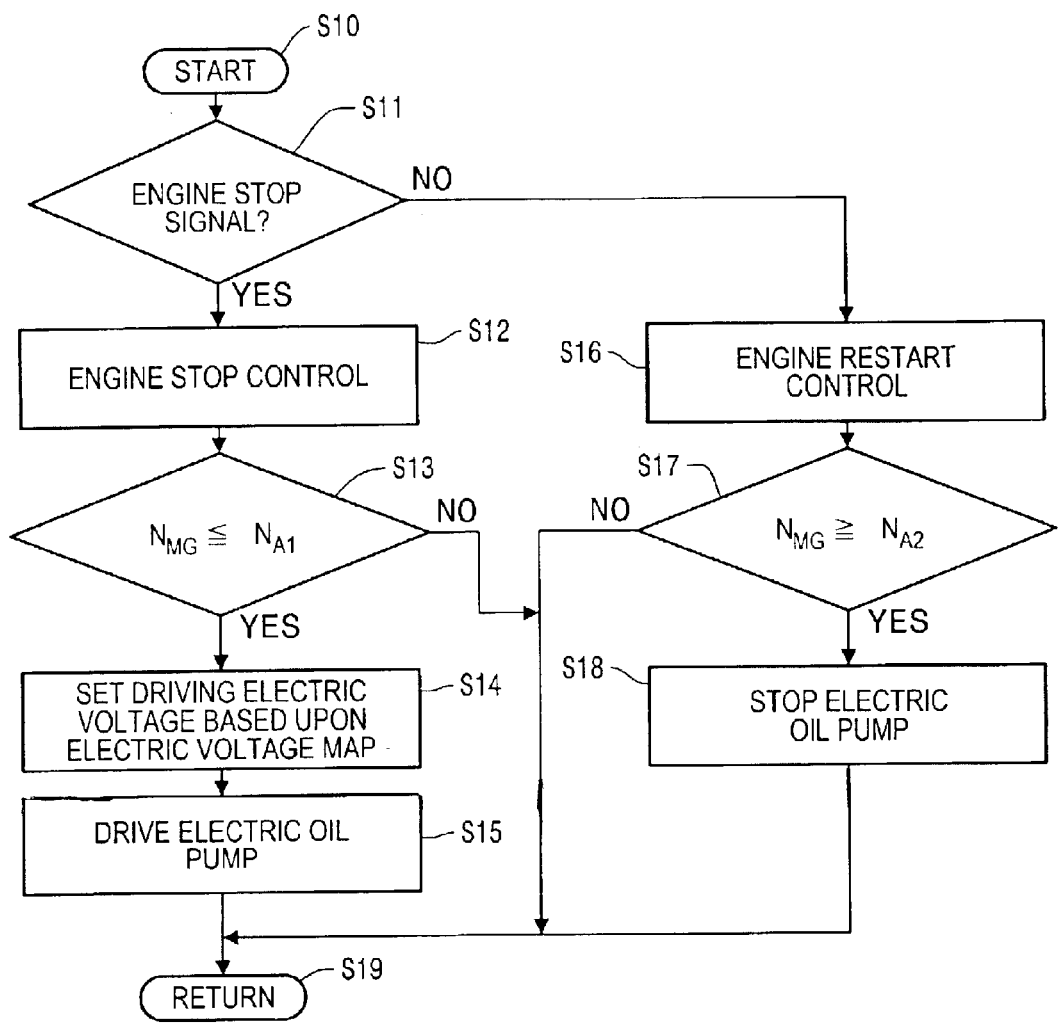
FIG. 6 is a flow chart showing a control of the vehicle control apparatus according to the invention.
Figure 7:
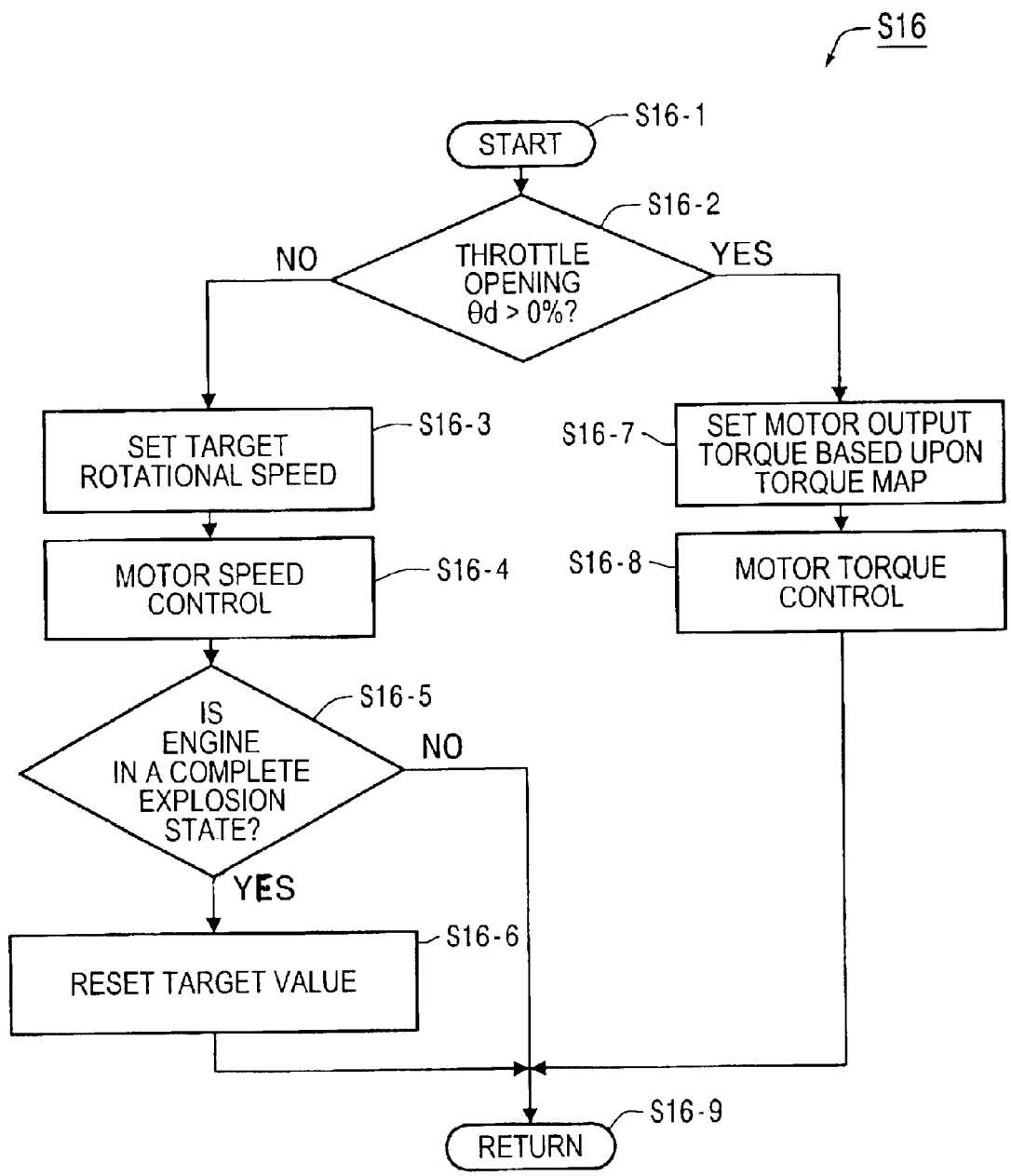
FIG. 7 is a flow chart showing an engine restart control.
Figure 8:
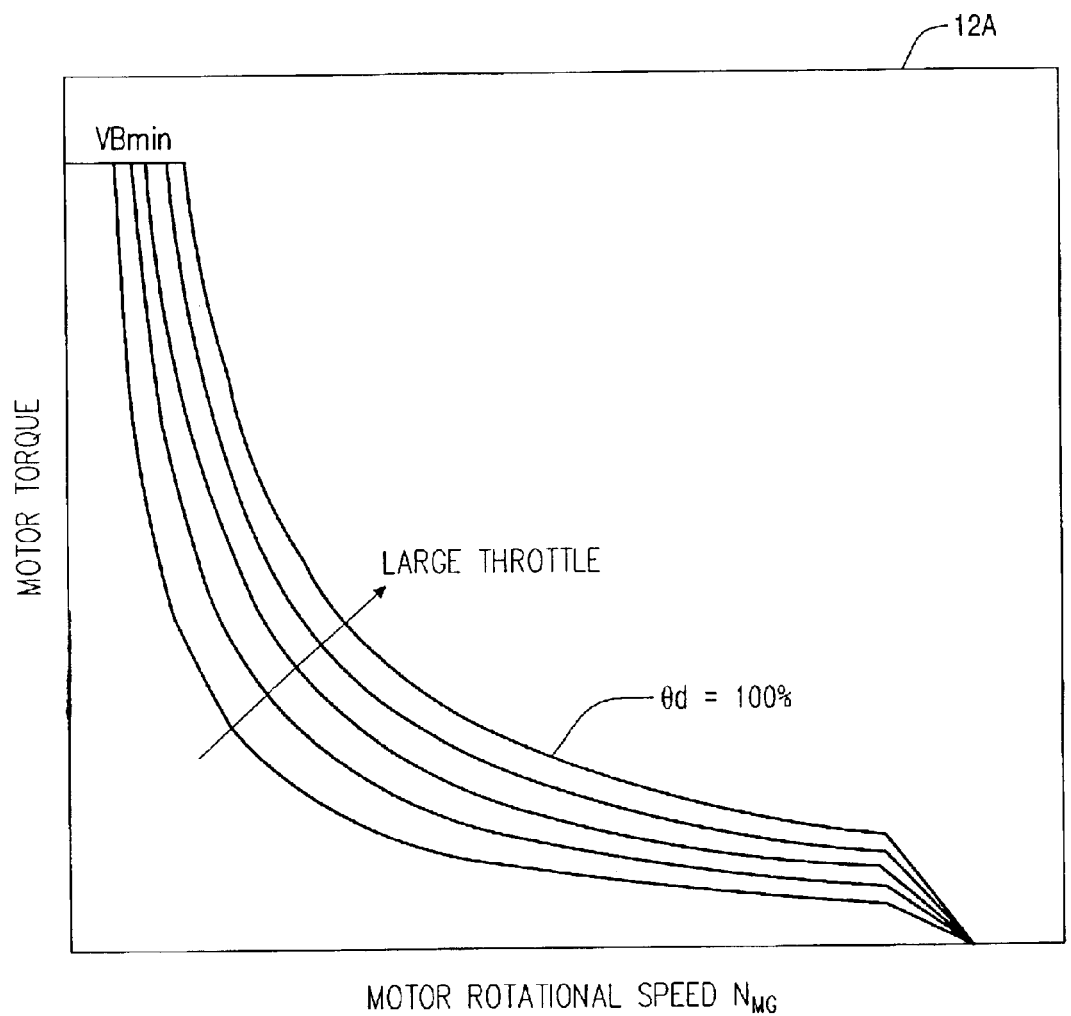
FIG. 8 is a view showing a motor torque map.
Figure 9:
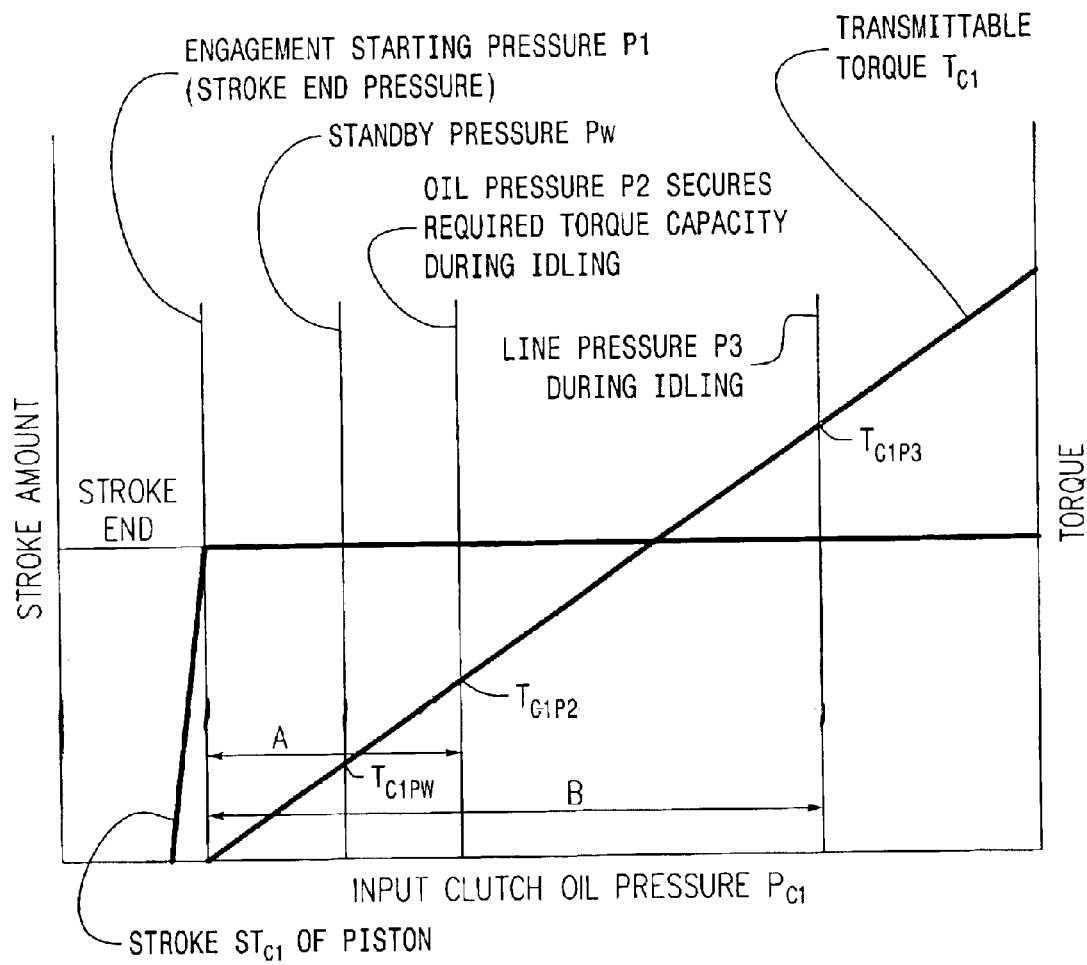
FIG. 9 is a view showing a relation among an input clutch oil pressure, a stroke of the input clutch and a transmittable torque.

Next, a description will be given of an operation of the control apparatus 1 of the vehicle mentioned above with reference to FIGS. 1, 6, 7, 8 and 9. FIG. 6 is a flow chart showing a control of the vehicle control apparatus according to the invention, FIG. 7 is a flow chart showing an engine restart control, FIG. 8 is a motor torque map, and FIG. 9 is a view showing a relation among an input clutch oil pressure, a stroke of the input clutch, and a transmittable torque.

As shown in FIG. 6, for example, when an ignition switch (not shown) in the vehicle is turned on, the control of the vehicle is started (S10). Then, it is judged whether an engine stop signal by the engine drive control mechanism 11 is output to the engine 2 (S11). When the vehicle is stopped and the brake is ON based upon the detection result of the vehicle speed sensor 24 and the brake sensor 22, the engine stop signal is output by the engine drive control mechanism 11 (YES in S11), and the stop control of the engine 2 is started (S12).

When the stop control of the engine 2 is started in step S12, an engine rotational speed Ne, namely, a motor rotational speed $N_{MG}$ starts decreasing and the electric oil pump control mechanism 15 judges whether the motor rotational number $N_{MG}$ (i.e. the engine rotational speed Ne) has become equal to or less than a predetermined rotational speed threshold value (a second rotational speed threshold value) $N_{A1}$ (S13). In this case, during the stop control of the engine 2, in order that the stop of the engine 2 is smoothly performed, the motor 3 is controlled by the motor drive control mechanism 12 so as to generate a negative torque (a torque in a direction in which the rotation of the engine 2 is stopped). Since the motor rotational speed $N_{MG}$ is not equal to or less than the predetermined rotational speed threshold value $N_{A1}$ (NO in S13) immediately after the stop control of the engine 2 is started, the process proceeds to step S19 and returns, thereby repeating the control described above.

In this case, since the rotation of the engine 2 is lowered based upon the stop control of the engine 2, and the oil pressure $P_{C1}$ supplied to the hydraulic servo of the clutch C1 by the mechanical oil pump 7 interlocking with the engine 2 is reduced, the predetermined rotational speed threshold value $N_{A1}$ is set to a value such that the standby pressure Pw can be maintained in accordance with the start of the oil pressure supply by the electric oil pump 8, and such a value that the supplied oil pressure of the mechanical oil pump 7 acts on the electric oil pump 8 and does not generate a load.

Thereafter, when the stop control of the engine 2 is further performed, and the motor rotational speed $N_{MG}$ becomes equal to or less than the predetermined rotational speed threshold value $N_{A1}$ (YES in S13), the electric oil pump control mechanism 15 sets the driving voltage V for driving the electric oil pump 8 (S14) based upon the electric voltage map M (refer to FIG. 5B), namely, it sets the operating voltage V such that the oil pressure $P_{C1}$ supplied to the hydraulic servo of the clutch C1 becomes the standby pressure Pw when the vehicle is stopped and the engine 2 is stopped, and drives the electric oil pump 8 based upon the operating voltage V (S15). Further, the process proceeds to step S19, and the control described above is repeated and the standby pressure Pw supplied by the electric oil pump 8 is maintained during the period when the engine stop signal is output by the engine control mechanism 11, namely, during the period when the engine 2 is stopped and the vehicle is stopped.

A description of setting the standby pressure Pw will now be given with reference to FIG. 9. When the hydraulic pressure (hereinafter, referred to as "input clutch oil pressure") $P_{C1}$ supplied to the hydraulic servo of the clutch C1 based upon the driving of the mechanical oil pump 7 or the electric oil pump 8 is, for example, 0, a stroke $ST_{C1}$ of the piston of the hydraulic servo in the clutch C1 is 0, and when the input clutch oil pressure $P_{C1}$ is increased at a certain degree, the piston of the hydraulic servo starts moving, and the stroke $ST_{C1}$ of the piston increases, namely, the gap disposed between the friction plates mentioned above and the piston becomes closed up due to the piston.

In this state, the clutch C1 does not engage, and the transmittable torque (hereinafter, also referred to as "torque capacity") $T_{C1}$ of the clutch C1 is 0.

When the input clutch oil pressure $P_{C1}$ increases, and the piston is in a state of contact with the friction plates, the movement of the piston stops, and the stroke $ST_{C1}$ of the piston becomes a stroke end, i.e. the input clutch oil pressure $P_{C1}$ is a stroke end pressure, the piston starts pressing the friction plates, engagement of the clutch C1 is started, and the torque transmission (power transmission) of the clutch C1 is started. Namely, the input clutch oil pressure $P_{C1}$ in this state is also an engagement starting pressure P1. Further, when the input clutch oil pressure $P_{C1}$ becomes equal to or greater than the engagement starting pressure P1, the torque transmission of the clutch C1 is started as mentioned above, and the transmittable torque $T_{C1}$ of the clutch C1 increases in connection with the increase of the input clutch oil pressure $P_{C1}$.

When the throttle opening (or the accelerator opening) is 0% during idling and the vehicle speed is 0, oil pressure is generated by the mechanical oil pump 7 interlocking with the engine 2, for example, based upon the driving of the engine 2, and a predetermined line pressure (a line pressure during idling) is generated by regulating (draining) the oil pressure of the mechanical oil pump 7 with the primary regulator valve 61 based upon the SLT pressure $P_{SLT}$ when the throttle opening (or accelerator opening) is 0%. At this time, line pressure from the mechanical oil pump 7 is supplied to the hydraulic servo of the clutch C1, namely, during idling, the input clutch oil pressure $P_{C1}$ becomes a line pressure P3 during idling shown at right in FIG. 9, and the transmittable torque $T_{C1}$ becomes a torque capacity $T_{C1P3}$.

In the embodiment, the primary regulator valve 61 regulates and generates the line pressure by regulating (draining) the pressure when the line pressure is generated based upon the oil pressure generated by the mechanical oil pump 7 during the idling. However, the structure may be such that the primary regulator valve 61 does not execute pressure regulating (draining) during idling, namely, the drain port of the primary regulator valve 61 becomes completely closed during idling, and in this case, the oil pressure generated by the mechanical oil pump 7 substantially becomes the line pressure as is.

Meanwhile, during idling, for example, the output torque of the engine 2 is input to the clutch C1 via the crankshaft 9, the torque converter 4, the input shaft 37 and the like. The torque input to the clutch C1 at this time (the input torque input during idling) is lower than the torque capacity $T_{C1P3}$ in the case of the line pressure P3, and if it is the transmittable torque $T_{C1P2}$ in the case where the input clutch oil pressure $P_{C1}$ is an oil pressure P2 that secures the required torque capacity during idling shown at left in FIG. 9, torque transmission by the clutch C1 is possible.

In the invention, instead of generating the standby pressure Pw generated by the electric oil pump 8 in the same manner as the line pressure P3 during idling by the mechanical oil pump 7, the standby pressure Pw is set less than the line pressure P3 during idling, and is set equal to or greater than the engagement starting pressure (stroke end pressure) P1 so as to prevent the clutch C1 from slipping when the vehicle starts which will be described in detail later. Further, since the engine 2 is stopped and the output torque of the engine 2 is 0, it is not necessary to secure the required torque capacity during idling. Accordingly, the standby pressure Pw is set equal to or greater than the oil pressure P2 that secures the required torque capacity during idling, namely, it is set to the torque capacity $T_{C1PW}$ which is lower than the torque capacity $T_{CP2}$.

Further, when, for example, the brake sensor 22 detects that the brake is turned off and the start requirement detecting mechanism 14 detects the start requirement, the standby pressure Pw is set to such a pressure that slipping is not generated in the clutch C1 even if the output torque of the motor 3 or the engine 2 is transmitted to the clutch C1 by adding the increase of the oil pressure $P_{C1}$ the supply of which is started to the hydraulic servo of the clutch C1 in accordance with the driving of the mechanical oil pump 7 based upon the driving of the motor 3.

The setting of the above standby pressure Pw can be set by setting the operating voltage V based upon the flow rate of the oil as mentioned above (refer to FIG. 5). Namely, since it is possible to change the rotational speed of the motor in the electric oil pump by changing the operating voltage V to change the oil pressure supplied to the clutch C1, it is therefore possible to change the setting of the standby pressure Pw based upon the change in the operating voltage V. In this case, the primary regulator valve 61 regulates based upon the SLT pressure $P_{SLT}$ of the linear solenoid valve (not shown) so as to achieve the line pressure P3 during idling. Once the standby pressure Pw is output by the electric oil pump 8, no draining (pressure regulating) is performed because the standby pressure Pw is lower than the line pressure P3 during idling. Namely, the drain port of the primary regulator valve 61 becomes a completely closed state, and the oil pressure generated by the electric oil pump 8 substantially becomes the input clutch oil pressure $P_{C1}$ (standby pressure Pw) as is.

In the embodiment, the clutch C1, which is a friction engagement element, is a multiple disc clutch having a plurality of friction plates, and the clutch C1 is engaged by pressing from the piston of the hydraulic servo. However, the clutch may be, for example, a so-called hand brake in which the friction engagement element fastens a drum by fastening a band according to the oil pressure, and so forth. The structure is not limited to this, and may be anything as long as it is possible to connect and disconnect power transmission. Further, in these structures, the oil pressure when starting power transmission becomes an engagement starting pressure.

Also, as shown in FIG. 6, for example, when it is detected by the brake sensor 22 that the brake has been turned off by the driver, the start requirement detecting mechanism 14 detects the vehicle start requirement based upon the detection result, and the engine drive control mechanism 11 ends output of the engine stop signal to the engine 2 (NO in S11). Then, the engine drive control mechanism 11 starts a restart control of the engine 2 (S16).

In the restart control of the engine 2 in step S16, as shown in FIG. 7, when starting the control (S16-1), the throttle opening detecting mechanism 13 first detects the throttle opening θd required by the driver based upon the throttle opening sensor 21, and judges whether the throttle opening θd is equal to or greater than 0%, namely, whether the accelerator pedal is being depressed by the driver (S16-2).

For example, in the case where the accelerator pedal is not depressed by the driver, and the throttle opening θd is 0% (NO in S16-2). Namely, since so-called creep traveling is required by the driver, assist torque from the motor 3 is not required. Therefore, the process proceeds to step S16-3. In order to execute only the restart of the engine 2 by the motor 3, a target rotational speed of the motor 3 is set to, for example, a rotational speed close to the engine rotational speed during idling by the motor drive control mechanism 12, and speed control of the motor 3 is executed so as to become the target rotational speed set by the motor drive control mechanism 12 (S16-4). Further, it is judged whether the engine 2 is in a complete explosion state (S16-5). If the engine is not in a complete explosion state (NO in S16-5), the process proceeds to step S19 via step S16-9 and step S17 to be described later, and the control is repeated by returning.

Subsequently, when it is detected by the engine rotational speed sensor 23 that the engine 2 has become a predetermined rotational speed (for example, the engine rotational speed during idling) based upon the driving (rotation) of the motor 3, the engine igniting mechanism 11a ignites the engine 2, judges the engine 2 is in a complete explosion state, for example, based upon a deviation generated between the target rotational speed of the motor 3 and the engine rotational speed Ne detected by the engine rotational speed sensor 23 (YES in S16-5), and resets the target value that is the target rotational speed of the motor 3 (S16-6). Thus, the engine 2 is restarted by the motor 3 Namely, the motor 3 performs the role of a so-called starter of the engine 2, and the engine 2 attains an idling state.

Meanwhile, for example, in the case where the accelerator pedal is depressed by the driver and the throttle opening θd is equal to or greater than 0% (YES in S16-2), namely, since acceleration is required by the driver, an assist torque becomes required by the motor 3. Therefore, the process proceeds to step S16-7, referring to the motor torque map 12a shown in FIG. 8. The torque that the motor 3 outputs in the motor rotational speed NMG in response to the throttle opening θd is determined in advance in the motor torque map 12a, and the motor drive control mechanism 12 sets the motor torque which the motor 3 outputs, by referring to the motor torque map 12a (S16-7). Further, the motor drive control mechanism 12 controls the output torque of the motor 3 based upon the set motor torque (S16-8), subsequently proceeds to step S19 via step S16-9 and step S17 to be described later, and returns to repeat the control.

Next, when proceeding to step S17, the electric oil pump control mechanism 15 judges whether the motor rotational speed $N_{MG}$ (i.e. the engine rotational speed Ne) has become equal to or greater than a predetermined rotational speed threshold value (first rotational speed threshold value) $N_{A2}$. If the motor rotational speed $N_{MG}$ has not become equal to or greater than the predetermined rotational speed threshold value $N_{A2}$ (NO in S17), the process proceeds to step S19 and returns. Further, when the motor rotational speed $N_{MG}$ becomes equal to or greater than the predetermined rotational speed threshold value $N_{A2}$ based upon the driving of the motor 3 in the restart control of the engine 2 mentioned above (YES in S17), the electric oil pump control mechanism 15 stops the electric oil pump 8 (S18), the process proceeds to step S19, and repeats the control.

In this case, the predetermined rotational speed threshold value $N_{A2}$ is set to a value such that the mechanical oil pump 7 is driven based upon the driving of the motor 3, the oil pressure $P_{C1}$ supplied to the hydraulic servo of the clutch C1 is increased by the mechanical oil pump 7 and the transmittable torque $T_{C1}$ of the clutch C1 can be sufficiently secured with respect to the torque input to the clutch C1.

In the embodiment, the electric oil pump control mechanism 15 drives the electric oil pump 8 based upon the engine rotational speed Ne (first and second rotational speed threshold values $N_{A1}$ and $N_{A2}$) interlocking with the driving of the mechanical oil pump 7 and generates the standby pressure Pw, however, the structure is not limited to this, and may be anything that can generate the standby pressure Pw based upon the driving state of the mechanical oil pump 7. The phrase "based upon the driving state of the mechanical oil pump 7" in the specification signifies a state in which at least the oil pressure supplied by the mechanical oil pump 7 is lower than the standby pressure Pw. Namely, the electric oil pump control mechanism 15 may supply the standby pressure Pw from the electric oil pump 8 to engage the friction engagement element (clutch C1), at least until the starting time, in a state where the oil pressure supplied by the mechanical oil pump 7 is lower than the standby pressure Pw. Further, the driving state of the mechanical oil pump 7 is detected by the engine rotational speed without directly detecting the oil pressure generated by the mechanical oil pump 7. However, the driving state of the mechanical oil pump 7 may be detected by providing an oil pressure sensor that detects the generated oil pressure of the mechanical oil pump 7, or a sensor for engine stop, vehicle speed, and the like. Further, the structure is not limited to this, and may be any structure that can detect the driving state of the mechanical oil pump 7.

Figure 10:
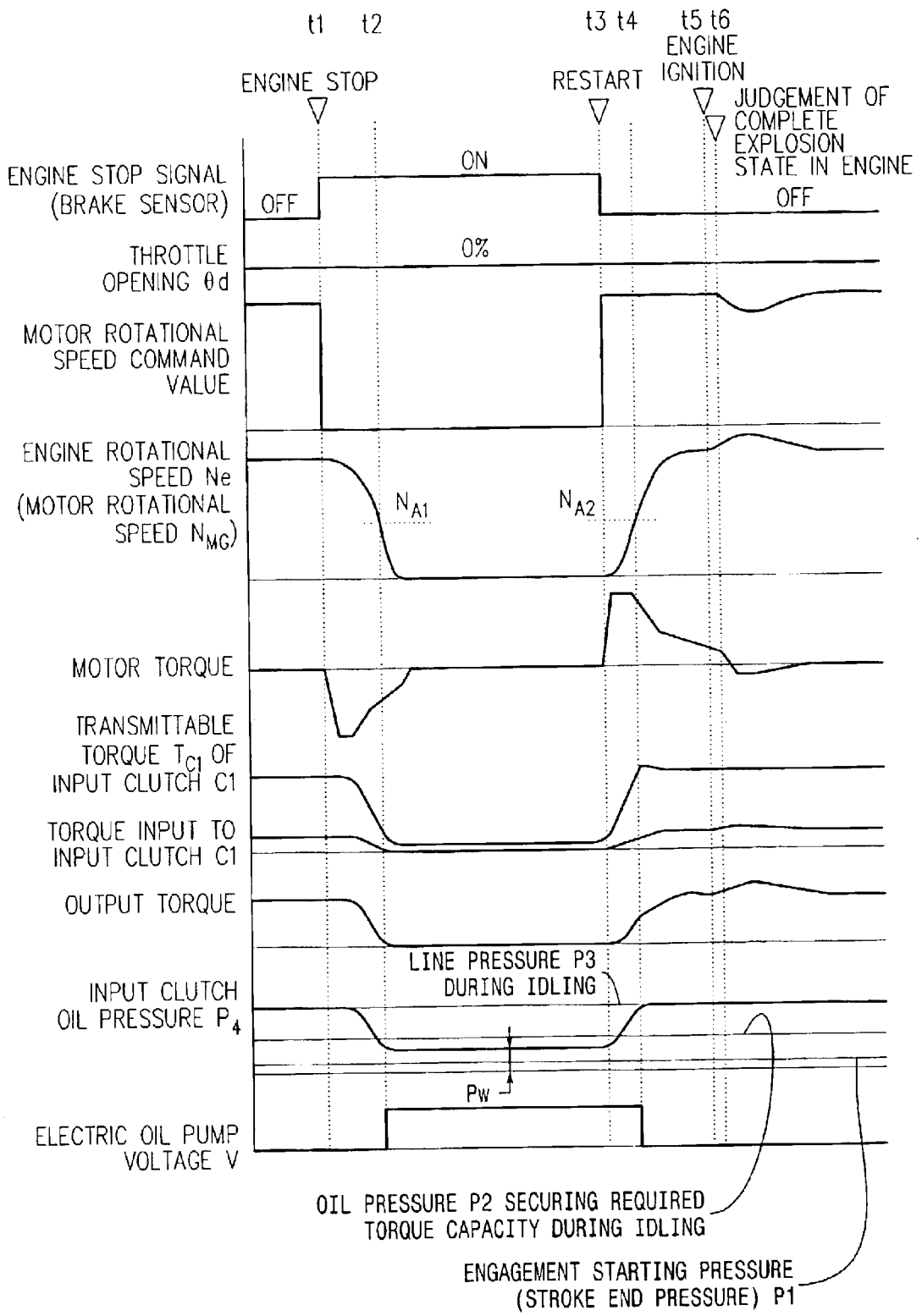
FIG. 10 is a time chart showing a control when a throttle opening is 0% at a required start time.
Figure 11:
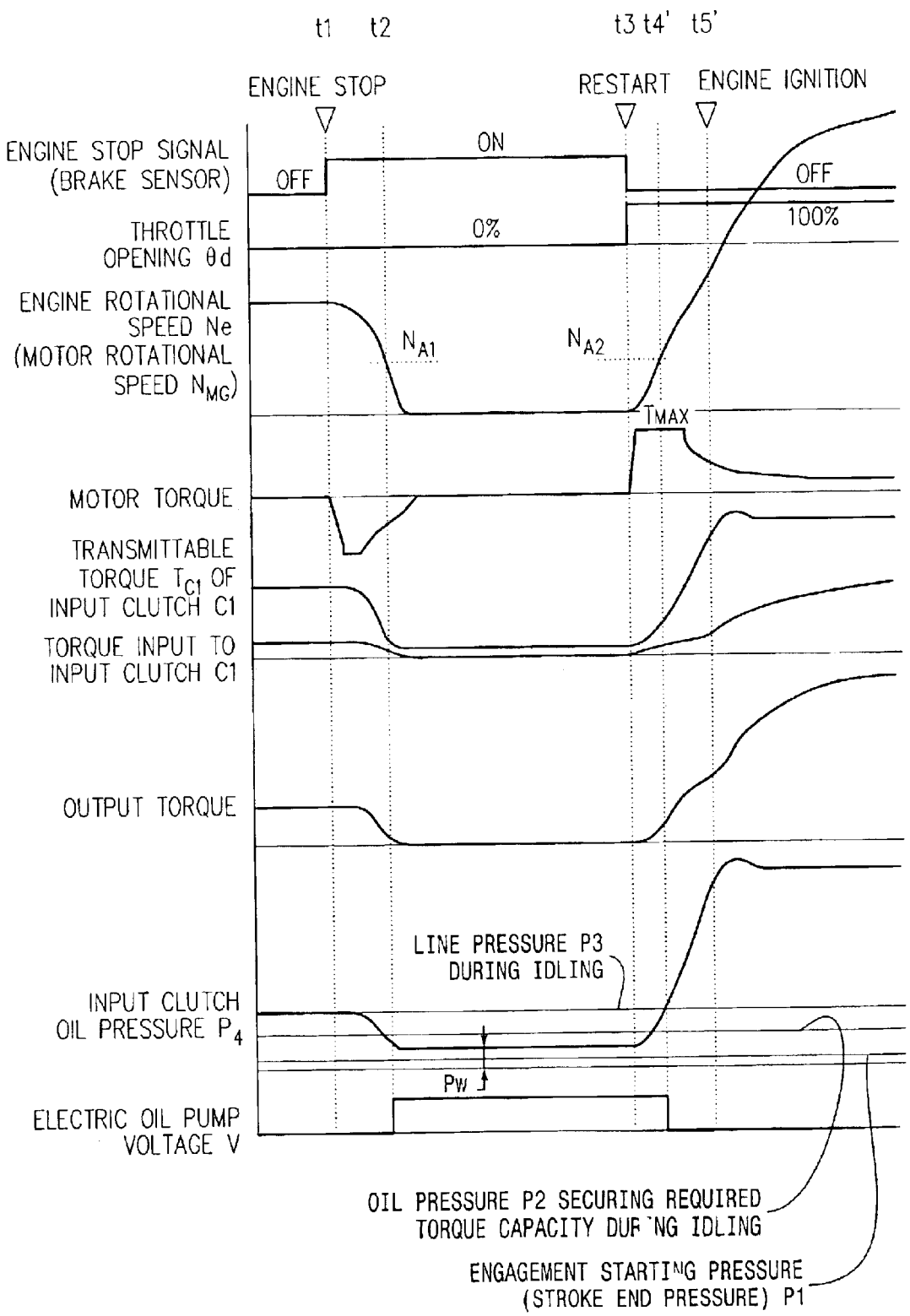
FIG. 11 is a time chart showing a control when the throttle opening is 100% at a required start time.

Next, based upon the control of the vehicle control apparatus 1, a description will be given of control examples when the throttle opening θd is 0% at the required start time and when the throttle opening θd is 100% at the required start time, with reference to FIGS. 10 and 11. FIG. 10 is a time chart showing a control in the case that the throttle opening is 0% at the start requiring time, and FIG. 11 is a time chart showing a control in the case that the throttle opening is 100% at the start requiring time.

First, a description will be given of the case when the throttle opening θd is 0% at the required start time. As shown in FIG. 10, when the vehicle attains a stopped state based upon the detection of the vehicle speed sensor 24, where the brake pedal is depressed by the driver (brake sensor 22 is ON), based upon the detection of the brake sensor 22, the engine stop signal is turned to ON by the engine drive control mechanism 11 at a time t1, and it is judged that the engine 2 stops (YES in S11). Then, the stop control of the engine 2 is started (S12), stopping of the engine 2 is started, and a motor rotational speed command value becomes 0, namely, in order to render the motor rotational speed $N_{MG}$ to 0, a negative torque is generated in the motor 3 and the engine 2 is controlled so as to smoothly stop.

Further, when the stop control of the engine 2 is started, the rotation of the mechanical oil pump 7 interlocking with the driving of the engine 2 also stops, and the oil pressure supplied by the mechanical oil pump 7 is lowered. Namely, the input clutch oil pressure $P_{C1}$ is lowered, and the transmittable torque $T_{C1}$ of the input clutch C1 is also accordingly reduced. Further, when the engine rotational speed Ne becomes equal to or less than the predetermined rotational speed threshold value $N_{A1}$ at a time t2 based upon the detection of the engine rotational speed sensor 23, the electric oil pump control mechanism 15 sets the operating voltage V of the electric oil pump 8 based upon the electric voltage map such that the input clutch oil pressure $P_{C1}$ becomes the standby pressure Pw as mentioned above (S14), and drives the electric oil pump 8 such that the standby pressure Pw, for example, becomes lower than the oil pressure supplied by the mechanical oil pump 7 during idling, namely, the line pressure of the hydraulic control device 6 during idling, and becomes such pressure by which the clutch C1 is engaged (S15). At this time, the engine rotational speed Ne is lowered, the torque input to the input clutch C1 is also reduced to 0, and the output (output torque) to the driven wheel is reduced to 0. Further, when the engine rotational speed Ne becomes 0, the motor 3 as well as the output of negative torque based upon the motor rotational speed command value are in a stopped state.

Further, between the time t2 and a time t3, the electric oil pump control mechanism 15 maintains the driving of the electric oil pump 8, and maintains the input clutch oil pressure PC1 to the standby pressure Pw set in the manner described above. Namely, the electric oil pump control mechanism 15 maintains the standby pressure Pw less than the line pressure P3 during idling preferably equal to or less than the oil pressure P2 that secures the required torque capacity during idling and equal to or greater than the engagement start pressure (stroke end pressure) P1. Further, the transmittable torque $T_{C1}$ of the input clutch C1 at this time is maintained to the torque capacity $T_{C1PW}$ (refer to FIG. 9) based upon the standby pressure Pw. Thereafter, at the time t3, when the brake pedal is released by the driver and the OFF state of the brake is detected by the brake sensor 22, the start requirement detecting mechanism 14 detects the start requirement based upon the detection result, and the restart control of the engine 2 is started by the engine drive control mechanism 11. Further, the throttle opening detecting mechanism 13 detects that the throttle opening θd is 0% based upon the detection of the throttle opening sensor 21 (NO in S16-2), the motor drive control mechanism 12 accordingly sets the target rotational speed of the motor 3 to the motor rotational speed command value, and starts the speed control of the motor 3 based upon the motor rotational speed command value (S16-3, S16-4).

Then, the motor 3 outputs a positive torque based upon the motor rotational speed command value to start driving, and the interlocking engine 2 and mechanical oil pump 7 are driven in accompaniment therewith. Therefore, the input clutch oil pressure $P_{C1}$ starts increasing with the increase of the oil pressure supplied by the mechanical oil pump 7 which is added to the standby pressure Pw from the electric oil pump 8. At this time, the torque input to the clutch C1 based upon the driving force of the motor 3 also increases. However, the clutch C1 does not slip because the input clutch oil pressure $P_{C1}$ is increased and the transmittable torque $T_{C1}$ of the clutch C1 is increased through the increase of the oil pressure supplied by the mechanical oil pump 7 added to the standby pressure Pw.

In this case, since the torque converter 4 is disposed between the motor 3 and the clutch C1, the output torque of the motor 3 is transmitted as a torque input to the clutch C1 with a slight delay, and the output torque also increases with a slight delay with respect to the driving of the motor 3. Namely, since the torque converter 4 is interposed, the torque input to the clutch C1 by the driving of the motor 3 is slightly delayed with respect to the input clutch oil pressure $P_{C1}$ that increases by the mechanical oil pump 7 interlocking with the driving of the motor 3. Thus, even if the standby pressure Pw is set even lower, more time is given to the addition of the increase of the input clutch oil pressure $P_{C1}$, in other words, it is possible to set the standby pressure Pw even lower.

Subsequently, at a time t4, when the engine rotational speed Ne becomes equal to or greater than the predetermined rotational speed threshold value $N_{A2}$ (YES in S17), the driving of the electric oil pump 8 is stopped by the electric oil pump control mechanism 15 (S18). However, at this time, the engine 2 and the mechanical oil pump 7 are driven by the motor 3, in a state where it is possible to sufficiently secure the transmittable torque $T_{C1}$ of the clutch C1 with respect to the torque input to the clutch C1 according to the input clutch oil pressure $P_{C1}$ from the mechanical oil pump 7, and the input clutch oil pressure $P_{C1}$ attains a state in which it becomes substantially identical to the line pressure P3 generated by the mechanical oil pump 7 during idling.

Thereafter, the engine rotational speed Ne further increases, and at a time t5, the engine igniting mechanism 11a detects that the engine rotational speed Ne has become a predetermined rotational speed (for example, an engine rotational speed during idling), and ignites the engine 2. When the engine 2 is ignited, it is judged whether the engine 2 is in a complete explosion state based upon the deviation between the engine rotational speed Ne detected by the engine rotational speed sensor 23 and the motor target rotational speed (i.e. the motor rotational speed command value), and at a time t6, the engine 2 is judged in a complete explosion state based upon the generation of the deviation (YES in S16-5). Further, when it is judged that the engine 2 is in a complete explosion state, the motor drive control mechanism 12 resets the target value that is the target rotational speed of the motor 3 (S16-6), and the engine 2 attains an idling state, namely, an oil pressure supply state of the mechanical oil pump 7 is caused by the driving of the engine 2. In the above control, the engine 2 restarts while the vehicle is started by the driving of the motor 3, namely, the vehicle travels with excellent so-called response, and the clutch C1 does not slip even once.

The motor rotational speed command value, the engine rotational speed Ne, the motor torque, the torque input to the clutch C1 and the output torque are affected by minute changes in the engine rotational speed Ne after restarting the engine 2. However, the input clutch oil pressure $P_{C1}$ and the transmittable torque $T_{C1}$ of the clutch C1, in particular, are not affected.

Next, a description will be given of the case where the throttle opening θd is 100% at the required start time. As shown in FIG. 11, when the vehicle attains a stopped state based upon the detection of the vehicle speed sensor 24, and the brake pedal is depressed by the driver (the brake sensor 22 is ON) based upon the detection of the brake sensor 22, the engine stop signal is turned ON by the engine drive control mechanism 11 at the time t1, and the engine 2 is judged as stopped (YES in S11). Then, the stop control of the engine 2 is started (S12), stopping of the engine 2 is started, and the motor rotational speed command value (not shown) becomes 0. Namely, in order to render the motor rotational speed $N_{MG}$ to 0, negative torque is generated in the motor 3 and the engine 2 is controlled so as to smoothly stop.

Further, when the stop control of the engine 2 is started, the rotation of the mechanical oil pump 7 interlocking with the driving of the engine 2 stops, and the oil pressure supplied by the mechanical oil pump 7 is lowered. Namely, the input clutch oil pressure $P_{C1}$ becomes lowered, and accordingly, the transmittable torque $T_{C1}$ of the input clutch C1 also lowers. Further, at the time t2, when the engine rotational speed Ne becomes equal to or less than the predetermined rotational speed threshold value $N_{A1}$ based upon the detection of the engine rotational speed sensor 23, the electric oil pump control mechanism 15 sets the operating voltage V of the electric oil pump 8 according to the electric voltage map such that the oil pressure (hereinafter, referred to as "input clutch oil pressure") supplied to the hydraulic servo of the clutch C1 becomes the standby pressure Pw as mentioned above (S14). The electric oil pump 8 is driven such that the standby pressure Pw, for example, becomes the oil pressure supplied by the mechanical oil pump 7 during idling. Namely, it becomes lower than the line pressure of the hydraulic control device 6 during idling, and becomes a pressure such that the clutch C1 is engaged (S15). At this time, the engine rotational speed Ne lowers, the torque input to the input clutch C1 is reduced to 0, and the output to the driven wheel (output torque) is also reduced to 0. Further, when the engine rotational speed Ne becomes 0, the motor 3 also attains a state in which the output of the negative torque is stopped based upon the motor rotational speed command value.

Further, between the time t2 and the time t3, the electric oil pump control mechanism 15 maintains the driving of the electric oil pump 8, and maintains the input clutch oil pressure $P_{C1}$ to the standby pressure Pw set as described above, namely, maintains the standby pressure Pw less than the line pressure P3 during idling, preferably equal to or less than the oil pressure P2 that secures the required torque capacity during idling and equal to or greater than the engagement start pressure (stroke end pressure) P1. Further, the transmittable torque $T_{C1}$ of the input clutch C1 at this time is maintained as the torque capacity $T_{C1PW}$ (refer to FIG. 9) based upon the standby pressure Pw. Thereafter, at the time t3, when the brake pedal is released by the driver and the OFF state of the brake is detected by the brake sensor 22, the start requirement detecting mechanism 14 detects the start requirement based upon the detection result, and the restart control of the engine 2 is started by the engine drive control mechanism 11. Further, the throttle opening detecting mechanism 13 detects that the throttle opening θd is 100% based upon the detection of the throttle opening sensor 21 (YES in S16-2), and the motor drive control mechanism 12 accordingly refers to the motor torque map 12a shown in FIG. 8 and sets the output torque of the motor 3 when the throttle opening θd is 100%, based upon the motor rotational speed $N_{MG}$ (S16-7).

At the time t3, as shown in FIG. 11, the vehicle has gone from a stopped state to a starting state and a state where the rotation of the motor 3 is starting. Therefore, the motor rotational speed $N_{MG}$ is low and, as shown in FIG. 8, the output torque of the motor 3 is set to a maximum torque Tmax based upon the motor rotational speed $N_{MG}$. Then, the motor drive control mechanism 12 controls the motor 3 so as to achieve the maximum torque Tmax (S16-8), drives the motor 3, and the interlocking engine 2 and the mechanical oil pump 7 are also driven. Therefore, the input clutch oil pressure $P_{C1}$ starts increasing as the oil pressure supplied by the mechanical oil pump 7 is added to the standby pressure Pw from the electric oil pump 8. At this time, the torque input to the clutch C1 according to the driving force (maximum torque Tmax) of the motor 3 also increases. However, the clutch C1 does not slip because the input clutch oil pressure $P_{C1}$ increases and the transmittable torque $T_{C1}$ of the clutch C1 increases through the addition of the increase in the oil pressure supplied by the mechanical oil pump 7 to the standby pressure Pw.

In this case, since the torque converter 4 is disposed between the motor 3 and the clutch C1, the output torque of the motor 3 is transmitted as torque input to the clutch C1 with a slight delay, and the output torque also increases with a slight delay with respect to the driving of the motor 3. Namely, since the torque converter 4 is interposed, the torque input to the clutch C1 by the driving of the motor 3 is slightly delayed with respect to the input clutch oil pressure $P_{C1}$ that increases by the mechanical oil pump 7 interlocking with the driving of the motor 3. Thus, even if the standby pressure Pw is set even lower, more time is given to the addition of the increase of the input clutch oil pressure $P_{C1}$, in other words, it is possible to set the standby pressure Pw even lower.

Subsequently, at a time t4', since the output of the motor 3 is larger than that at the time t4 shown in FIG. 10 described above, the engine rotational speed Ne increases faster, when the engine rotational speed Ne becomes equal to or greater than the predetermined rotational speed threshold value $N_{A2}$ (YES in S17), the driving of the electric oil pump 8 is stopped by the electric oil pump control mechanism 15 (S18). At this time, the engine 2 and the mechanical oil pump 7 are driven by the motor 3, in a state where it is possible to sufficiently secure the transmittable torque $T_{C1}$ of the clutch C1 with respect to the torque input to the clutch C1 by the input clutch oil pressure $P_{C1}$ from the mechanical oil pump 7, and a state in which the input clutch oil pressure $P_{C1}$ becomes equal to or greater than the line pressure P3 during idling. Since the output of the motor 3 is larger (the time of the maximum torque Tmax of the motor 3 is longer) than when the throttle opening θd mentioned above is 0%, the engine rotational speed Ne increases faster. Therefore, the engine rotational speed Ne becomes equal to or greater than the predetermined rotational speed threshold value $N_{A2}$ at the time t4' which is faster than the time t4 shown in FIG. 10.

Thereafter, since the motor rotational speed $N_{MG}$ is further increased, the output torque of the motor 3 is no longer the maximum torque Tmax due to the characteristics of the motor as shown in FIG. 8. However, the motor 3 continuously outputs as much torque as can be output. Also, the engine rotational speed Ne further increases, and at a time t5', the engine igniting mechanism 11a detects that the engine rotational speed Ne has become a predetermined rotational speed (for example, an engine rotational speed during idling), and ignites the engine 2. In accordance with the ignition of the engine 2, the engine rotational speed Ne continuously increases in connection with the driving of the engine 2. Therefore, the input clutch oil pressure $P_{C1}$ becomes an oil pressure supply state of the mechanical oil pump 7 due to the driving of the engine 2. In the above control, the engine 2 restarts while the vehicle is started by the driving of the motor 3, namely, the vehicle travels with excellent so-called response, and the clutch C1 does not slip even once.

Restarting of the engine 2 ends, and pressure from the driving of the mechanical pump 7 based upon the driving of the engine 2 is supplied as the input clutch oil pressure $P_{C1}$, namely, a normal line pressure is controlled by the hydraulic control device 6. Thereafter, since the hydraulic control device 6 does not supply excess oil pressure to the hydraulic servo of the clutch C1, it controls the line pressure when the line pressure becomes a predetermined maximum pressure, and maintains the input clutch oil pressure $P_{C1}$ such that it is substantially constant at the predetermined pressure.

As described above, according to the vehicle control apparatus 1 of the invention, the standby pressure Pw is set to a pressure less than the line pressure P3 generated based upon the driving of the mechanical oil pump 7 during idling and equal to or greater than the engagement starting pressure P1 by which the clutch C1 starts transmitting torque. Therefore, it is possible to set low the standby pressure Pw supplied by the electric oil pump 8, and thus allowing downsizing of the electric oil pump 8 in addition to enabling a reduction in electric power consumption.

In addition, alternatively, the standby pressure Pw is set to a pressure less than the line pressure P3 generated based upon the driving of the mechanical oil pump 7 during idling and equal to or greater than the stroke pressure P1 which brings the piston and the friction plate into mutual contact without a gap. Therefore, it is possible to set low the standby pressure Pw supplied by the electric oil pump 8, and thus allowing downsizing of the electric oil pump 8 in addition to enabling a reduction in electric power consumption.

More preferably, the standby pressure Pw is set to the pressure equal to or less than the pressure P2 capable of transmitting the input torque input to the clutch C1 during idling. Therefore, it is possible to set the standby pressure Pw supplied by the electric oil pump 8 still lower, and thus allow further downsizing of the electric oil pump 8 in addition to enabling a further reduction in electric power consumption.

Further, the standby pressure Pw is set to a pressure such that slipping is not generated in the clutch C1 due to the torque input to the clutch C1 by adding the increase of the oil pressure, supplied to the hydraulic servo from driving the mechanical oil pump 7 based upon the driving of the motor 3, while the oil pressure generated by the driving of the mechanical oil pump 7 becomes the line pressure after detecting the start requirement, or while the engine 2 is ignited after detecting the start requirement. Therefore it is possible to prevent a time lag from being generated when the vehicle starts, as well as slipping of the clutch C1 which generates a shock. It is also possible to set low the standby pressure Pw supplied by the electric oil pump 8, and thus allow downsizing of the electric oil pump 8 in addition to enabling a reduction in electric power consumption.

Further, the standby pressure is set to a pressure such that slipping is not generated in the clutch C1 due to the increase of oil pressure supplied to the hydraulic servo from the driving of the mechanical oil pump 7 based upon the driving of the motor 3 while the engine 2 is ignited after detecting the start requirement, with respect to all throttle openings θd when the start requirement has been detected. Therefore, when the vehicle starts, it is possible to prevent a time lag from generating and slipping of the clutch C1 which generates a shock, whatever the throttle opening θd at a required start time.

Further, since the start requirement detecting mechanism 14 detects the start requirement of the vehicle based upon the release of the brake according to the detection of the brake sensor 22, when the brake is released, the motor 3 can be immediately driven by the motor drive control mechanism 12 to transmit the driving force to the driven wheel, whereby it is possible to secure drivability.

In addition, the motor 3 is directly connected to the crankshaft 9. Therefore, for example, it is possible to transmit the output torque of the motor 3 to the engine 2 via the crankshaft 9, even when the output torque of the motor 3 is large, whereby it is possible to rotate the engine 2 by driving the motor 3 when the start requirement has been detected, as well as enabling excellent so-called response.

Further, since the vehicle control apparatus 1 stops the driving of the electric oil pump 8 when the rotational speed of the engine 2 is equal to or greater than the first rotational speed threshold value, it is possible to stop the electric oil pump 8 after it reaches a state capable of sufficiently securing the transmittable torque of the friction engagement element according to the supply of the oil pressure from the mechanical oil pump 7.

Since the vehicle control apparatus 1 starts the driving of the electric oil pump 8 when the rotational speed of the engine 2 is equal to or less than the second rotational speed threshold value, therefore, before the oil pressure supplied to the hydraulic servo of the friction engagement element by the mechanical oil pump 7 is lowered, the oil pressure can be supplied by the electric oil pump 8 and it is possible to maintain the standby pressure in the stopped state of the engine 2.

Further, since the output torque of the motor 3 is transmitted to the clutch C1 via the torque converter 4 with a slight delay (refer to FIG. 3), when the vehicle starts, it is possible to transmit the output torque of the motor 3 to the clutch C1 after the increase of the oil pressure supplied by the mechanical oil pump 7, that starts driving in accordance with the driving of the motor 3, is added to the standby pressure Pw. Therefore, it is possible to set the standby pressure Pw supplied by the electric oil pump 8 still lower, and thus allow further downsizing of the electric oil pump 8 in addition to enabling a further reduction in electric power consumption.

In the above embodiment, an example is described in which the automatic transmission mechanism 5 is applied to the present vehicle control apparatus 1. However, the invention is not limited to this, and may be any automatic transmission mechanism. In particular, it is preferable that the motor be directly connected to the crankshaft (and the engine). Further, the vehicle control apparatus 1 is such that the motor is directly connected to the crankshaft. However, for example, it may be any structure as long as the driving of the motor can be directly transmitted to the crankshaft by a chain, a large capacity belt or the like.

Also, the embodiment describes, as an example, the automatic transmission mechanism 5 which is a stepped transmission mechanism that performs, for example, five forward gear speed stages and one reverse gear speed stage based upon a connection and disconnection of a plurality of friction engagement elements. However, the invention is not limited to this, and may be other stepped transmission mechanisms including a belt type (CVT type) or troidal type stepless transmission mechanism. In particular, the invention can be applied to any structure as long as a friction engagement element is provided which can transmit, based upon the oil pressure, power transmission between the engine, the motor, and the driven wheel at a starting time.

Further, in the embodiment, the automatic transmission 10 is provided with the torque converter 4 as a fluid transmission device. However, the invention is not limited to this, and for example, may be provided with a starting device, constituted by a spring and the like, and in particular, may not be provided with a torque converter or a starting device. Further, in this case, it is preferable to set the standby pressure Pw (for example, set slightly higher than that of a structure provided with the torque converter), based upon a temporal relation between the torque input to the clutch C1 and the input clutch oil pressure $P_{C1}$ mentioned above.

What is claimed is:

1. A vehicle control apparatus, comprising:
    an engine that outputs a driving force;
    an automatic transmission having a friction engagement element freely engaging power transmission between said engine and a driven wheel;
    a hydraulic servo that controls an engagement state of said friction engagement element based upon a supplied oil pressure;
    a mechanical oil pump interlocking and driving with said engine and supplying the oil pressure to said hydraulic servo;
    an electric oil pump supplying the oil pressure to said hydraulic servo; and a controller that controls driving of said electric oil pump and generates a standby pressure supplied to said hydraulic servo based upon a driving state of said mechanical oil pump, wherein said standby pressure is set less than a line pressure generated based upon driving said mechanical oil pump during idling and equal to or greater than an engagement starting pressure by which said friction engagement element starts transmitting a torque.

2. The vehicle control apparatus according to claim 1, wherein said standby pressure is set equal to or less than a pressure capable of transmitting an input torque to said friction engagement element during idling.

3. The vehicle control apparatus according to claim 1, further comprising:

a crankshaft transmitting the driving force of said engine;

a motor transmitting the driving force to said crankshaft; and a first detector for detecting a start requirement of the vehicle, wherein the controller drives said motor based upon a detection result of said first detector and said standby pressure is set to a pressure such that slipping is not generated in said friction engagement element due to an input torque to said friction engagement element based upon the driving force of said motor by adding an increase of oil pressure supplied to said hydraulic servo by driving said mechanical oil pump while the oil pressure, generated by the driving of said mechanical oil pump, becomes the line pressure after detecting said start requirement.

4. The vehicle control apparatus according to claim 3, further comprising:

a second detector that detects a throttle opening, wherein said controller controls the driving force at a time of driving said motor in response to a detection result of said second detector and said standby pressure is set to a pressure such that slipping is not generated in said friction engagement element due to the increase of oil pressure supplied to said hydraulic servo by driving said mechanical oil pump while the oil pressure, generated by the driving of said mechanical oil pump, becomes the line pressure after detecting said start requirement, with respect to all said throttle openings upon detecting said start requirement.

5. The vehicle control apparatus according to claim 1, further comprising:

a crankshaft transmitting the driving force of said engine;

a motor transmitting the driving force to said crankshaft; and a first detector that detects a start requirement of the vehicle, wherein the controller drives said motor based upon a detection result of said first detector, ignites said engine based upon the driving of said motor at a time when said engine becomes a predetermined rotational speed from a stopped state, and said standby pressure is set to a pressure such that slipping is not generated in said friction engagement element due to an input torque to said friction engagement element based upon the driving force of said motor by adding an increase of oil pressure supplied to said hydraulic servo by driving said mechanical oil pump while said engine is ignited after detecting said start requirement.

6. The vehicle control apparatus according to claim 5, further comprising a second detector that detects a throttle opening, wherein the controller controls the driving force at a time of driving said motor in response to a detection result of said second detector, and said standby pressure is set to a pressure such that slipping is not generated in said friction engagement element due to the increase of oil pressure supplied to said hydraulic servo by driving said mechanical oil pump while said engine is ignited after detecting said start requirement, with respect to all said throttle openings upon detecting said start requirement.

7. The vehicle control apparatus according to claim 3, wherein said first detector detects the start requirement of the vehicle based upon a release of a brake.

8. The vehicle control apparatus according to claim 3, wherein said motor is directly connected to said crankshaft.

9. The vehicle control apparatus according to claim 5, wherein said first detector detects the start requirement of the vehicle based upon a release of a brake.

10. The vehicle control apparatus according to claim 5, wherein said motor is directly connected to said crankshaft.

11. The vehicle control apparatus according to claim 1, wherein said controller stops the driving of said electric oil pump when a rotational speed of said engine is equal to or greater than a first rotational speed threshold value.

12. The vehicle control apparatus according to claim 1, wherein controller starts the driving of said electric oil pump when the rotational speed of said engine is equal to or less than a second rotational speed threshold value.

13. The vehicle control apparatus according to claim 1, wherein said automatic transmission has a fluid transmitting device, and a gear transmitting mechanism for switching a transmission path according to a connection or a disconnection of a plurality of friction engagement elements and changing speed of the rotation of an input shaft which is output to said driven wheel, and said friction engagement element is an input clutch which engages with at least a first forward gear speed stage in said plurality of friction engagement elements to connect with the rotation of said input shaft.

14. A vehicle control apparatus, comprising:

an engine that outputs a driving force;

an automatic transmission having a friction engagement element freely engaging power transmission between said engine and a driven wheel based upon a pressing state of a friction plate;

a hydraulic servo having a piston pressing said friction plate based upon a supplied oil pressure and controlling an engagement state of said friction engagement element in accordance with the pressing of said piston;

a mechanical oil pump interlocking and driving with said engine and supplying the oil pressure to said hydraulic servo;

an electric oil pump supplying the oil pressure to said hydraulic servo; and a controller that controls driving of said electric oil pump and generates a standby pressure supplied to said hydraulic servo based upon a driving state of said mechanical oil pump, wherein said standby pressure is set less than a line pressure generated based upon driving said mechanical oil pump during idling and equal to or greater than a stroke end pressure for bringing said piston and said friction plate into mutual contact without a gap.

15. The vehicle control apparatus according to claim 14, wherein said standby pressure is set equal to or less than a pressure capable of transmitting an input torque to said friction engagement element during idling.

16. The vehicle control apparatus according to claims 14, further comprising:
- a crankshaft transmitting the driving force of said engine;
- a motor transmitting the driving force to said crankshaft; and
- a first detector for detecting a start requirement of the vehicle, wherein the controller drives said motor based upon a detection result of said first detector and said standby pressure is set to a pressure such that slipping is not generated in said friction engagement element due to an input torque to said friction engagement element based upon the driving force of said motor by adding an increase of oil pressure supplied to said hydraulic servo by driving said mechanical oil pump while the oil pressure, generated by the driving of said mechanical oil pump, becomes the line pressure after detecting said start requirement.

17. The vehicle control apparatus according to claim 16, further comprising:
- a second detector that detects a throttle opening, wherein said controller controls the driving force at a time of driving said motor in correspondence to a detection result of said second detector and said standby pressure is set to a pressure such that slipping is not generated in said friction engagement element due to the increase of oil pressure supplied to said hydraulic servo by driving said mechanical oil pump while the oil pressure, generated by the driving of said mechanical oil pump, becomes the line pressure after detecting said start requirement, with respect to all said throttle openings upon detecting said start requirement.

18. The vehicle control apparatus according to claim 14, further comprising:
- a crankshaft transmitting the driving force of said engine;
- a motor transmitting the driving force to said crankshaft; and
- a first detector that detects a start requirement of the vehicle, wherein the controller drives said motor based upon a detection result of said first detector, ignites said engine based upon the driving of said motor at a time when said engine becomes a predetermined rotational speed from a stopped state, and said standby pressure is set to a pressure such that slipping is not generated in said friction engagement element due to an input torque to said friction engagement element based upon the driving force of said motor by adding an increase of oil pressure supplied to said hydraulic servo by driving said mechanical oil pump while said engine is ignited after detecting said start requirement.

19. The vehicle control apparatus according to claim 18, further comprising
- a second detector that detects a throttle opening, wherein the controller controls the driving force at a time of driving said motor in response to a detection result of said second detector, and said standby pressure is set to a pressure such that slipping is not generated in said friction engagement element due to the increase of oil pressure supplied to said hydraulic servo by driving said mechanical oil pump while said engine is ignited after detecting said start requirement, with respect to all said throttle openings upon detecting said start requirement.

20. The vehicle control apparatus according to claim 16, wherein said first detector detects the start requirement of the vehicle based upon a release of a brake.

21. The vehicle control apparatus according to claim 16, wherein said motor is directly connected to said crankshaft.

22. The vehicle control apparatus according to claim 18, wherein said first detector detects the start requirement of the vehicle based upon a release of a brake.

23. The vehicle control apparatus according to claim 18, wherein said motor is directly connected to said crankshaft.

24. The vehicle control apparatus according to claim 14, wherein said controller stops the driving of said electric oil pump when a rotational speed of said engine is equal to or greater than a first rotational speed threshold value.

25. The vehicle control apparatus according to claim 14, wherein controller starts the driving of said electric oil pump when the rotational speed of said engine is equal to or less than a second rotational speed threshold value.

26. The vehicle control apparatus according to claim 14, wherein
- said automatic transmission has a fluid transmitting device, and a gear transmitting mechanism for switching a transmission path according to a connection or a disconnection of a plurality of friction engagement elements and changing speed of the rotation of an input shaft which is output to said driven wheel, and
- said friction engagement element is an input clutch which engages with at least a first forward gear speed stage in said plurality of friction engagement elements to connect with the rotation of said input shaft.

27. A method of operating a vehicle with an engine that outputs a driving force, an automatic transmission having a friction engagement element freely engaging power transmission between said engine and a driven wheel, a hydraulic servo that controls an engagement state of said friction engagement element based upon a supplied oil pressure, a mechanical oil pump interlocking and driving with said engine and supplying the oil pressure to said hydraulic servo and an electric oil pump supplying the oil pressure to said hydraulic servo, comprising:
- driving said electric oil pump in order to generate a standby pressure which is supplied to said hydraulic servo based upon a driving state of said mechanical oil pump, wherein said standby pressure is set less than a line pressure generated based upon driving said mechanical oil pump during idling and equal to or greater than an engagement starting pressure by which said friction engagement element starts transmitting a torque.

28. A method of operating a vehicle with an engine that outputs a driving force, an automatic transmission having a friction engagement element freely engaging power transmission between said engine and a driven wheel based upon a pressing state of a friction plate, a hydraulic servo having a piston pressing said friction plate based upon a supplied oil pressure and controlling an engagement state of said friction engagement element in accordance with the pressing of said piston, a mechanical oil pump interlocking and driving with said engine and supplying the oil pressure to said hydraulic servo and an electric oil pump supplying the oil pressure to said hydraulic servo, comprising
- driving said electric oil pump in order to generate a standby pressure which is supplied to said hydraulic servo based upon a driving state of said mechanical oil pump, wherein said standby pressure is set less than a line pressure generated based upon driving said mechanical oil pump during idling and equal to or greater than a stroke end pressure for bringing said piston and said friction plate into mutual contact without a gap.

* * * * *